US011842507B2

(12) United States Patent
Nagai

(10) Patent No.: US 11,842,507 B2
(45) Date of Patent: Dec. 12, 2023

(54) DISTANCE MEASURING CAMERA

(71) Applicant: MITSUMI ELECTRIC CO., LTD., Tama (JP)

(72) Inventor: Fumiya Nagai, Tama (JP)

(73) Assignee: MITSUMI ELECTRIC CO., LTD., Tama (JP)

( * ) Notice: Subject to any disclaimer, the term of this patent is extended or adjusted under 35 U.S.C. 154(b) by 236 days.

(21) Appl. No.: 17/428,613

(22) PCT Filed: Dec. 2, 2019

(86) PCT No.: PCT/JP2019/046955
§ 371 (c)(1),
(2) Date: Aug. 4, 2021

(87) PCT Pub. No.: WO2020/162003
PCT Pub. Date: Aug. 13, 2020

(65) Prior Publication Data
US 2022/0120562 A1  Apr. 21, 2022

(30) Foreign Application Priority Data

Feb. 6, 2019  (JP) ................. 2019-020123

(51) Int. Cl.
*G01C 3/02* (2006.01)
*G06T 7/55* (2017.01)
(Continued)

(52) U.S. Cl.
CPC .................. *G06T 7/55* (2017.01); *G01C 3/02* (2013.01); *G06T 7/536* (2017.01); *G06T 7/571* (2017.01); *G06T 7/593* (2017.01)

(58) Field of Classification Search
CPC ........... G06T 7/55; G06T 7/536; G06T 7/493; G06T 7/571
See application file for complete search history.

(56) References Cited

U.S. PATENT DOCUMENTS

2008/0212838 A1\* 9/2008 Frigerio ............... G06V 10/147
382/107
2011/0050854 A1\* 3/2011 Kanamori ............ H04N 13/261
348/46
(Continued)

FOREIGN PATENT DOCUMENTS

EP  3026628 A1 \* 6/2016 ........... G02B 3/0006
JP  H03200007 A  9/1991
(Continued)

OTHER PUBLICATIONS

ISA Japan Patent Office, International Search Report Issued in Application No. PCT/JP2019/046955, dated Jan. 28, 2020, WIPO, 5 pages.

*Primary Examiner* — David N Werner
(74) *Attorney, Agent, or Firm* — McCoy Russell LLP

(57) ABSTRACT

A distance measurement camera contains a first optical system OS1 for forming a first subject image, a second optical system OS2 for forming a second subject image, an imaging part S for imaging the first subject image and the second subject image and a distance calculating part 4 for performing calculation depending on image heights of distance measurement target points of the first subject image and the second subject image corresponding to a distance measurement target point of a subject 100 to calculate the distance to the subject 100 based on an image magnification ratio between a magnification of the first subject image and a magnification of the first subject image and a magnification of the second subject image.

8 Claims, 13 Drawing Sheets

(51) Int. Cl.
    *G06T 7/536*     (2017.01)
    *G06T 7/571*     (2017.01)
    *G06T 7/593*     (2017.01)

(56) References Cited

U.S. PATENT DOCUMENTS

| | | | | |
|---|---|---|---|---|
| 2013/0278817 | A1* | 10/2013 | Ikemoto | G01C 3/08 |
| | | | | 348/348 |
| 2015/0324991 | A1* | 11/2015 | Schmidt | H04N 13/243 |
| | | | | 348/136 |
| 2016/0316190 | A1* | 10/2016 | McCloskey | G06T 7/55 |
| 2016/0379066 | A1 | 12/2016 | Reiche et al. | |
| 2017/0154204 | A1* | 6/2017 | Ryu | G06V 10/462 |
| 2018/0367772 | A1* | 12/2018 | Nobayashi | G02B 7/34 |
| 2019/0043203 | A1* | 2/2019 | Fleishman | G06F 18/29 |
| 2019/0130591 | A1* | 5/2019 | Tanaka | G06T 5/20 |
| 2019/0213746 | A1* | 7/2019 | Azuma | G01B 11/00 |
| 2020/0065942 | A1* | 2/2020 | Hiasa | G06T 7/55 |

FOREIGN PATENT DOCUMENTS

| | | | | |
|---|---|---|---|---|
| JP | 2001141422 | A | 5/2001 | |
| JP | 2012026841 | A | 2/2012 | |
| JP | 2019032295 | A | 2/2019 | |
| JP | 2019109124 | A | 7/2019 | |
| RU | 2595759 | C2 * | 8/2016 | G01B 11/22 |
| WO | 2019124040 | A1 | 6/2019 | |
| WO | 2019181622 | A1 | 9/2019 | |

\* cited by examiner

DISTANCE MEASURING CAMERA

CROSS REFERENCE TO RELATED APPLICATIONS

The present application is a U.S. National Phase of International Application No. PCT/JP2019/046955 entitled "DISTANCE MEASUREMENT CAMERA," and filed on Dec. 2, 2019. International Application No. PCT/JP2019/046955 claims priority to Japanese Patent Application No. 2019-020123 filed on Feb. 6, 2019. The entire contents of each of the above-listed applications are hereby incorporated by reference for all purposes.

TECHNICAL FIELD

The present disclosure generally relates to distance measuring cameras for measuring a distance to a distance measurement target point of a subject, for instance to a distance measuring camera for measuring a distance to a distance measurement target point of a subject based on an image magnification ratio between at least two subject images respectively formed by at least two optical systems whose changes of magnifications of the subject images according to the distance to the distance measurement target point of the subject are different from each other.

BACKGROUND AND SUMMARY

Conventionally, there has been proposed a distance measuring camera for measuring a distance to an arbitrary distance measurement target point of a subject by imaging the subject. As such a distance measuring camera, there has been known a stereo camera type distance measuring camera including at least two pairs of an optical system for collecting light from a subject to form a subject image and an image sensor for converting the subject image formed by the optical system to image data (for example, see patent document 1).

The stereo camera type distance measuring camera disclosed in the patent document 1 calculates a parallel disparity (disparity in a direction perpendicular to an optical axis direction) between the distance measurement target points of the two subject images respectively formed by the two optical systems arranged so as to be shifted from each other in a direction perpendicular to the optical axis direction and calculates the distance to the distance measurement target point of the subject based on a value of the parallel disparity.

The stereo camera type distance measuring camera as described above cannot accurately calculate the distance to the distance measurement target point of the subject when the parallel disparity between the distance measurement target points of the subject images is small. Thus, it is necessary to arrange the two optical systems so as to be largely spaced apart from each other in the direction perpendicular to the optical axis direction in order to sufficiently increase the parallel disparity between the distance measurement target points of the subject images. This makes it difficult to reduce a size of the distance measuring camera.

Further, when the subject is located at a near distance from the distance measuring camera, there may be a situation that the distance measurement target point of the subject image for calculating the parallel disparity exists in one of two obtained image data and does not exist in the other one of the two obtained image data due to a relationship of visual fields of the two obtained image data. In order to avoid this situation, it is necessary to arrange the two optical systems so as to be close to each other. However, if the two optical systems are arranged so as to be close to each other, the parallel disparity between the distance measurement target points of the subject images decreases and thus accuracy of the distance measurement reduces. Therefore, it is difficult to accurately calculate the distance to the distance measurement target point of the subject located at the near distance from the distance measuring camera with the distance measurement based on the parallel disparity between the distance measurement target points of the subject images.

To address this problem, an image magnification ratio type distance measuring camera for calculating a distance to a distance measurement target point of a subject based on an image magnification ratio between two subject images (ratio between magnifications of two subject images) respectively formed by two optical systems has been proposed by the inventor of the present disclosure and others. The image magnification ratio type distance measuring camera uses a first optical system and a second optical system configured so that changes of magnifications of a first subject image and a second subject image respectively formed by the first optical system and the second optical system according to the distance to the distance measurement target point of the subject are different from each other and calculates the distance to the distance measurement target point of the subject based on an image magnification ratio between the first subject image formed by the first optical system and the second subject image formed by the second optical system (the ratio between the magnifications of the first subject image and the second subject image) (see patent document 2).

In this image magnification ratio type distance measuring camera, the parallel disparity between the distance measurement target points of the subject images is not utilized for calculating the distance to the distance measurement target point of the subject. Thus, even if the first optical system and the second optical system are arranged so as to be close to each other, the image magnification ratio type distance measuring camera can accurately calculate the distance to the distance measurement target point of the subject. Therefore, it is possible to reduce the size of the distance measuring camera. Further, since the image magnification ratio between the first subject image and the second subject image can be accurately obtained even when the subject is located at the near distance from the distance measuring camera, the image magnification ratio type distance measuring camera can accurately calculate the distance to the distance measurement target point of the subject located at the near distance.

The image magnification ratio type distance measuring camera proposed by the present inventor and the others utilizes a position of an intersection point between an optical axis of each optical system and an extended line of a principal ray at each image height in an image space of each optical system to calculate the distance to the distance measurement target point of the subject based on the image magnification ratio between the first subject image formed by the first optical system and the second subject image formed by the second optical system (the ratio of the magnifications of the subject images). As is well known in the optical field, in an optical system in which vignetting does not occur, a position of an intersection point between an optical axis of the optical system and an extended line of a principal ray at each image height in an image space of the optical system does not change even if a value of the image height in the image space of the optical system changes and coincides with a position of an exit pupil of the optical system. Thus, the image magnification ratio type distance measuring camera proposed by the present inventor and the others utilizes a distance "$EP_1$" from an exit pupil of the first optical system to an image formation position of the first subject image when the subject is located at an infinite distance point and a distance "$EP_2$" from an exit pupil of the second optical system to an image formation position of the second subject image when the subject is located at the infinite distance point in order to calculate the distance to the distance measurement target point of the subject.

On the other hand, in an optical system in which the vignetting occurs depending on the image height, a position of an intersection point between an optical axis of the optical system and an extended line of a principal ray at an image height in an image space of the optical system changes when a value of the image height in the image space of the optical system changes. When the image height of the distance measurement target point of the subject image in the image space of the optical system which corresponds to the distance measurement target point of the subject is low, influence caused by the vignetting as described above is small and thus the position of the intersection point between the optical axis of the optical system and the extended line of the principal ray at the image height in the image space of the optical system substantially coincides with the position of the exit pupil of the optical system. Thus, when the image height of the distance measurement target point of the subject image in the image space of the optical system which corresponds to the distance measurement target point of the subject is low, the image magnification ratio type distance measuring camera proposed by the present inventor and the others can accurately calculate the distance to the distance measurement target point of the subject. On the other hand, as the image height of the distance measurement target point of the subject image in the image space of the optical system which corresponds to the distance measurement target point of the subject increases, the influence caused by the vignetting as described above increases and thus a difference between the position of the intersection point between the optical axis of the optical system and the extended line of the principal ray at the image height in the image space of the optical system and the position of the exit pupil of the optical system also increases. Therefore, if each of the first optical system and the second optical system is the optical system in which the vignetting occurs depending on the image height, there has been a problem that when the image magnification ratio type distance measuring camera proposed by the present inventor and the others is used, an error in the distance measurement for the distance to the distance measurement target point of the subject increases as the image height of the distance measurement target point of the subject image in the image space of the optical system increases.

RELATED ART DOCUMENTS

Patent Documents

JP 2012-26841A
JP 2017-241896

SUMMARY OF THE INVENTION

Problem to be Solved by the Invention

The present disclosure has been made in view of the above-mentioned problem of the conventional art. Accordingly, it is an object of the present disclosure to provide a distance measuring camera which can accurately calculate a distance to a distance measurement target point of a subject based on an image magnification ration between a magnification of a first subject image formed by a first optical system and a magnification of a second subject image formed by a second optical system even if each of the first optical system and the second optical system used for calculating the distance to the distance measurement target point of the subject is an optical system in which vignetting occurs and image heights of distance measurement target points of the first subject image and the second subject image corresponding to the distance measurement target point of the subject are high.

Means for Solving the Problem

This object is achieved by the present disclosures defined in the following (1) to (9).

(1) A distance measuring camera for calculating a distance to a distance measurement target point of a subject, comprising:
  a first optical system for collecting light from the subject to form a first subject image;
  a second optical system for collecting the light from the subject to form a second subject image;
  an imaging part for imaging the first subject image formed by the first optical system and the second subject image formed by the second optical system; and
  a distance calculating part for performing calculation depending on image heights of distance measurement target points of the first subject image and the second subject image corresponding to the distance measurement target point of the subject to calculate the distance to the distance measurement target point of the subject based on the first subject image and the second subject image imaged by the imaging part,
  wherein the distance calculating part calculates the distance to the distance measurement target point of the subject based on an image magnification ratio between a magnification of the first subject image and a magnification of the second subject image.

(2) The distance measuring camera according to the above (1), wherein the first optical system is an optical system in which vignetting occurs depending on the image height of the distance measurement target point of the first subject image corresponding to the distance measurement target point of the subject and a position of an intersection point between an optical axis of the first optical system and an extended line of a principal ray at the image height of the distance measurement target point of the first subject image in an image space of the first optical system changes depending on the image height of the distance measurement target point of the first subject image,
  wherein the second optical system is an optical system in which vignetting occurs depending on the image height of the distance measurement target point of the second subject image corresponding to the distance measurement target point of the subject and a position of an intersection point between an optical axis of the second optical system and an extended line of a principal ray at the image height of the distance measurement target point of the second subject image in an image space of the second optical system changes depending on the image height of the distance measurement target point of the second subject image, and wherein the distance calculating part is configured to perform the calculation using a distance from the intersection point between the optical axis of the first optical system and the extended line of the principal ray at the image height of the distance measurement target point of the first subject image in the image space of the first optical system to an image formation position of the first subject image when the subject is located at an infinite distance point and a distance from the intersection point between the optical axis of the second optical system and the extended line of the principal ray at the image height of the distance measurement target point of the second subject image in the image space of the second optical system to an image formation position of the second subject image when the subject is located at the infinite distance point to calculate the distance to the distance measurement target point of the subject based on the image magnification ratio between the magnification of the first subject image and the magnification of the second subject image.

(3) The distance measuring camera according to the above (2), wherein the first optical system and the second optical system are configured so that a focal length of the first optical system and a focal length of the second optical system are different from each other, and thereby a change of the magnification of the first subject image according to the distance to the distance measurement target point of the subject is different from a change of the magnification of the second subject image according to the distance to the distance measurement target point of the subject.

(4) The distance measuring camera according to the above (2) or (3), wherein the first optical system and the second optical system are configured so that the distance from the intersection point between the optical axis of the first optical system and the extended line of the principal ray at the image height of the distance measurement target point of the first subject image in the image space of the first optical system to the image formation position of the first subject image when the subject is located at the infinite distance point is different from the distance from the intersection point between the optical axis of the second optical system and the extended line of the principal ray at the image height of the distance measurement target point of the second subject image in the image space of the second optical system to the image formation position of the second subject image when the subject is located at the infinite distance point, and thereby a change of the magnification of the first subject image according to the distance to the distance measurement target point of the subject is different from a change of the magnification of the second subject image according to the distance to the distance measurement target point of the subject.

(5) The distance measuring camera according to any one of the above (2) to (4), wherein a difference in a depth direction exists between a front principal point of the first optical system and a front principal point of the second optical system, and thereby a change of the magnification of the first subject image according to the distance to the distance measurement target point of the subject is different from a change of the magnification of the second subject image according to the distance to the distance measurement target point of the subject.

(6) The distance measuring camera according to any one of the above (1) to (5), further comprising an association information storage part storing association information for associating the image magnification ratio between the magnification of the first subject image and the magnification of the second subject image with the distance to the distance measurement target point of the subject,
wherein the distance calculating part calculates the distance to the distance measurement target point of the subject based on the image magnification ratio between the magnification of the first subject image and the magnification of the second subject image and the association information in the association information storage part.

(7) The distance measuring camera according to any one of the above (1) to (6), wherein the distance calculating part calculates a ratio between the image height of the distance measurement target point of the first subject image corresponding to the distance measurement target point of the subject and the image height of the distance measurement target point of the second subject image corresponding to the distance measurement target point of the subject as the image magnification ratio between the magnification of the first subject image and the magnification of the second subject image.

(8) The distance measuring camera according to any one of the above (1) to (7), wherein the imaging part contains a first image sensor for imaging the first subject image and a second image sensor for imaging the second subject image.

(9) The distance measuring camera according to any one of the above (1) to (7), wherein the imaging part is a single image sensor for imaging both of the first subject image and the second subject image.

Effects of the Invention

The distance measuring camera of the present disclosure uses at least two optical systems (a first optical system and a second optical system) configured so that changes of magnifications of a first subject image and a second subject image according to a distance to a distance measurement target point of a subject are different from each other and performs calculation depending on image heights of distance measurement target points of the first subject image and the second subject image corresponding to the distance measurement target point of the subject to measure the distance to the distance measurement target point of the subject based on an image magnification ratio between the first subject image and the second subject image (ratio between magnifications of the first subject image and the second subject image) respectively formed by the two optical systems. Therefore, even if each of the first optical system and the second optical system used for calculating the distance to the distance measurement target point of the subject is an optical system in which vignetting occurs and the image heights of the distance measurement target points of the first subject image formed by the first optical system and the second subject image formed by the second optical system which correspond to the distance measurement target point of the subject are high, it is possible to accurately measure the distance to the distance measurement target point of the subject.

DETAILED DESCRIPTION

Figure 1:
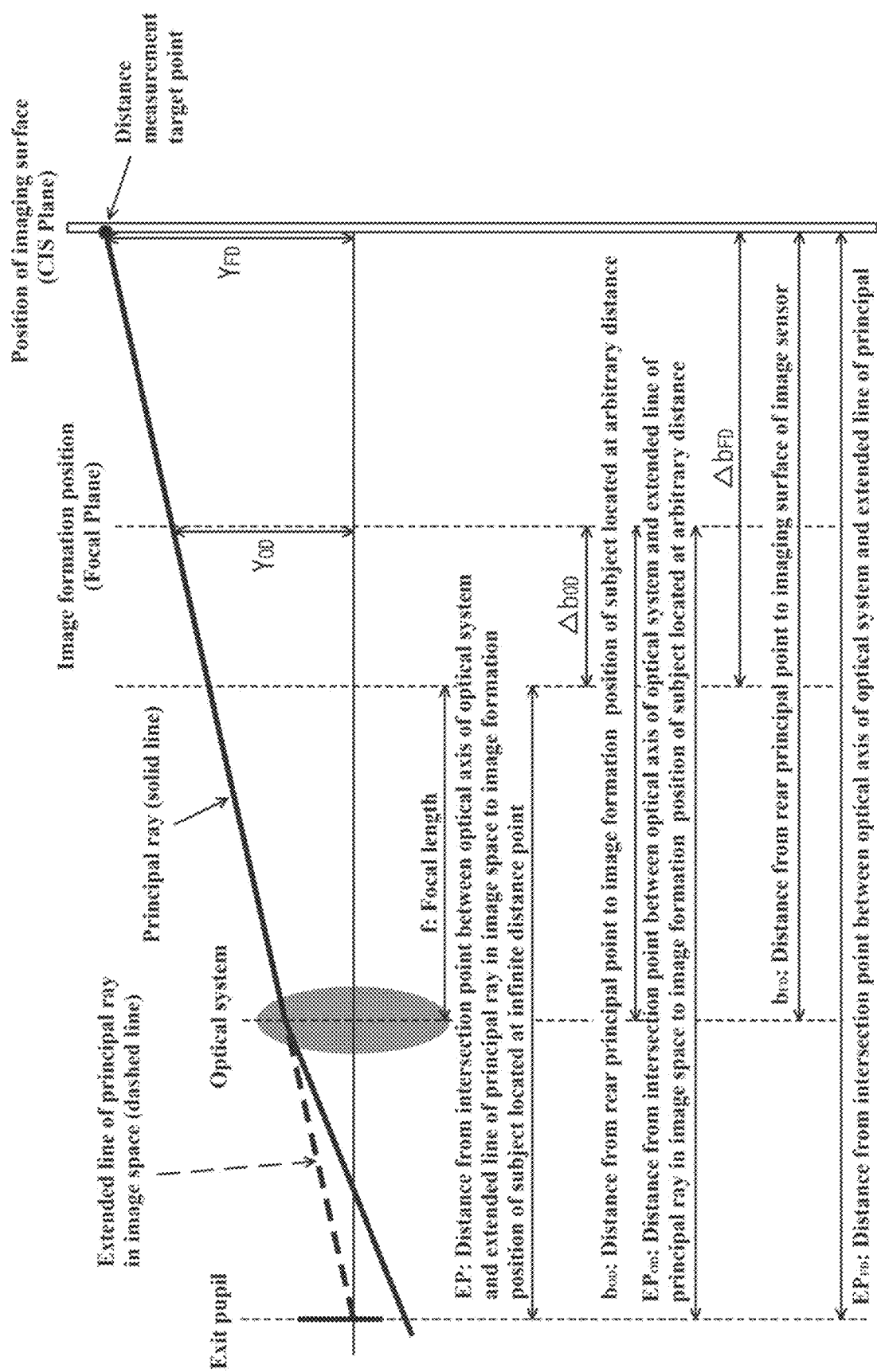
FIG. 1 is a view for explaining a distance measuring principle of a distance measuring camera of the present disclosure.

First, description will be given to a distance measuring principle used in a distance measuring camera of the present disclosure for calculating a distance to a distance measurement target point of a subject. The distance measuring principle for calculating the distance to the distance measurement target point of the subject will be explained with assuming that an optical system used in the distance measuring camera is an optical system in which vignetting depending on a size and a thickness of lenses, a mechanical aperture stop (a flare cutter) or the like constituting the optical system does not occur.

A magnification "$m_{OD}$" of a distance measurement target point of a subject image corresponding to the distance measurement target point of the subject and formed by the optical system can be calculated from a distance (subject distance) "a" from a front principal point (front principal plane) of the optical system to the subject, a distance "$b_{OD}$" from a rear principal point (rear principal plane) of the optical system to an image formation position of the distance measurement target point of the subject image and a focal length "f" of the optical system according to the following equation (1) derived from the lens equation.

[Equation 1]

$$m_{OD} = \frac{b_{OD}}{a} = \frac{f}{a-f} \quad (1)$$

Further, an image height (a distance from an optical axis of the optical system in a direction perpendicular to the optical axis of the optical system) "$Y_{OD}$" of the distance measurement target point of the subject image in an image space of the optical system (a space on the side of the image sensor from the optical system) can be calculated from the magnification "$m_{OD}$" of the distance measurement target point of the subject image and an actual size (a distance from the optical axis of the optical system in the direction perpendicular to the optical axis of the optical system) "sz" of the distance measurement target point of the subject in an object space (a space on the side of the subject from the optical system) according to the following equation (2).

[Equation 2]

$$Y_{OD} = sz \cdot m_{OD} = \frac{sz \cdot f}{a-f} \quad (2)$$

When an imaging surface of the image sensor (imaging element) is located at the image formation position of the subject image, that is, when the subject image is in the best focus, the image height "$Y_{OD}$" of the distance measurement target point of the subject image can be calculated by the above equation (2). When the optical system has an autofocus function and always images the subject with the best focus, the image height "$Y_{OD}$" of the distance measurement target point of the subject image can be calculated by the above equation (2).

However, when the optical system is a fixed focus system having no autofocus function and the imaging surface of the image sensor (imaging element) is not located at the image formation position of the subject image, that is, when defocus is present, it is required to consider a defocus amount, that is, a difference (shift amount) between the image formation position of the subject image and a position of the imaging surface of the image sensor in a depth direction (optical axis direction) in order to obtain an image height "$Y_{FD}$" of the distance measurement target point of the subject image formed on the imaging surface of the image sensor.

As shown in FIG. 1, the distance measurement target point of the subject image corresponding to the distance measurement target point of the subject is formed on the imaging surface of the image sensor located on the side of the image space of the optical system. In FIG. 1, a distance from an intersection point between the optical axis of the optical system and an extended line of a principal ray at the image height of the distance measurement target point of the subject image in the image space of the optical system (at the distance from the optical axis of the optical system in the direction perpendicular to the optical axis of the optical system) to an image formation position of the subject image when the subject is located at an infinite distance point is defined as "EP". Further, a distance from the intersection point between the optical axis of the optical system and the extended line of the principal ray at the image height of the distance measurement target point of the subject image in the image space of the optical system to an image formation position of the subject image when the subject is located at an arbitrary distance "a" is defined as "$EP_{OD}$". Further, a distance from the intersection point between the optical axis of the optical system and the extended line of the principal ray at the image height of the distance measurement target point of the subject image in the image space of the optical system to the imaging surface of the image sensor (Focus Distance) is defined as "$EP_{FD}$". Further, a distance from the rear principal point of the optical system to the image formation position of the subject image when the subject is located at the arbitrary distance "a" is defined as "$b_{OD}$". Further, a distance from the rear principal point of the optical system to the imaging surface of the image sensor is defined as "$b_{FD}$". As shown in FIG. 1, if vignetting depending on a size and a thickness of a lens, a mechanical aperture stop (a flare cutter) or the like constituting the optical system does not occur, a position of the intersection point between the optical axis of the optical system and the extended line of the principal ray at the image height of the distance measurement target point of the subject image in the image space of the optical system coincides with a position of the exit pupil of the optical system regardless of a value of the image height of the distance measurement target point of the subject image in the image space of the optical system.

The distance "$b_{OD}$" from the rear principal point of the optical system to the image formation position of the subject image when the subject is located at the arbitrary distance "a" can be calculated according to the following equation (3) derived from the lens equation.

[Equation 3]

$$b_{OD} = \frac{1}{1/f - 1/a} = \frac{a \cdot f}{a - f} \quad (3)$$

Therefore, a difference "$\Delta b_{OD}$" between the focal length "f" and the distance "$b_{OD}$" can be calculated according to the following equation (4).

[Equation 4]

$$\Delta b_{OD} = b_{OD} - f = \frac{a \cdot f}{a - f} - f = \frac{f^2}{a - f} \quad (4)$$

Further, the distance "$b_{FD}$" from the rear principal point of the optical system to the imaging surface of the image sensor can be calculated from a distance "$a_{FD}$" from the front principal point of the optical system to the distance measurement target point of the subject when the subject image is in the best focus on the imaging surface of the image sensor according to the following equation (5) derived from the lens equation.

[Equation 5]

$$b_{FD} = \frac{1}{1/f - 1/a_{FD}} = \frac{a_{FD} \cdot f}{a_{FD} - f} \quad (5)$$

Therefore, a difference "$\Delta b_{FD}$" between the focal length "f" and the distance "$b_{FD}$" can be calculated according to the following equation (6).

[Equation 6]

$$\Delta b_{FD} = b_{FD} - f = \frac{a_{FD} \cdot f}{a_{FD} - f} - f = \frac{f^2}{a_{FD} - f} \quad (6)$$

Further, as is clear from FIG. 1, a right-angled triangle having one vertex at the intersection point between the optical axis of the optical system and the extended line of the principal ray at the image height of the distance measurement target point of the subject image in the image space of the optical system and one side which is the image height "$Y_{OD}$" of the distance measurement target point of the subject image at the image formation position of the subject image when the subject is located at the arbitrary distance "a" is similar to a right-angled triangle having one vertex at the intersection point between the optical axis of the optical system and the extended line of the principal ray at the image height of the distance measurement target point of the subject image in the image space of the optical system and one side which is the image height "$Y_{FD}$" of the distance measurement target point of the subject image on the imaging surface of the image sensor. Therefore, "$EP_{OD}$":"$EP_{FD}$"="$Y_{OD}$":"$Y_{FD}$" is satisfied from the similarity relationship and the image height "$Y_{FD}$" of the distance measurement target point of the subject image on the imaging surface of the image sensor can be calculated according to the following equation (7).

[Equation 7]

$$EP_{OD} \overset{\wedge}{\underset{\vee}{}} EP_{FD} = Y_{OD} \overset{\vee}{\underset{\wedge}{}} Y_{FD} \quad (7)$$

$$EP + \Delta b_{OD} \overset{\wedge}{\underset{\vee}{}} EP + \Delta b_{FD} = Y_{OD} \overset{\vee}{\underset{\wedge}{}} Y_{FD}$$

$$Y_{FD} = \frac{EP + \Delta b_{FD}}{EP + \Delta b_{OD}} \vee Y_{OD} = \left( \frac{f^2 - EP \cdot f + EP \cdot a_{FD}}{a_{FD} - f} / \frac{f^2 - EP \cdot f + EP \cdot a}{a - f} \right) \wedge \frac{sz \cdot f}{a - f}$$

$$= \frac{sz \cdot f \cdot (f^2 - EP \cdot f + EP \cdot a_{FD})}{(a_{FD} - f) \cdot (f^2 - EP \cdot f + EP \cdot a)}$$

As is clear from the above equation (7), the image height "$Y_{FD}$" of the distance measurement target point of the subject image on the imaging surface of the image sensor in the image space of the optical system can be expressed as a function of the actual size (the distance from the optical axis of the optical system in the direction perpendicular to the optical axis of the optical system) "sz" of the distance measurement target point of the subject in the object space, the focal length "f" of the optical system, the distance "EP" from the intersection point between the optical axis of the optical system and the extended line of the principal ray at the image height of the distance measurement target point of the subject image in the image space of the optical system to the image formation position of the subject image when the subject is located at the infinite distance point, the distance (subject distance) "a" from the optical system to the distance measurement target point of the subject and the distance "$a_{FD}$" from the optical system to the distance measurement target point of the subject when the subject image is in the best focus on the imaging surface of the image sensor.

Figure 2:
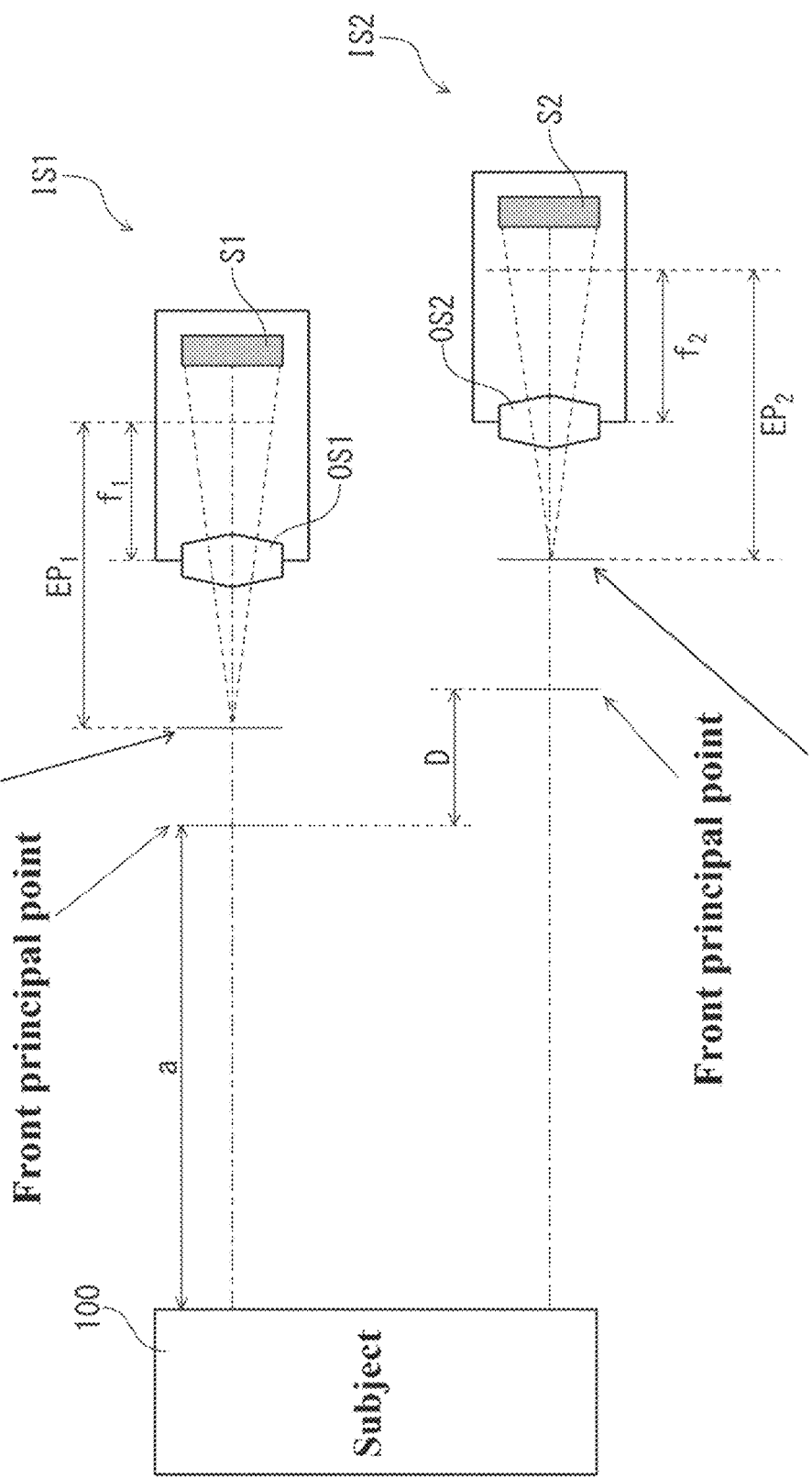
FIG. 2 is another view for explaining the distance measuring principle of the distance measuring camera of the present disclosure.

Next, it is assumed that one subject 100 is imaged by using two imaging systems IS1, IS2 as shown in FIG. 2. The first imaging system IS1 includes a first optical system OS1 for collecting light from the subject 100 to form a first subject image and a first image sensor S1 for imaging the first subject image formed by the first optical system OS1. The second imaging system IS2 includes a second optical system OS2 for collecting the light from the subject 100 to form a second subject image and a second image sensor S2 for imaging the second subject image formed by the second optical system OS2. Further, as is clear from FIG. 2, although an optical axis of the first optical system OS1 of the first imaging system IS1 and an optical axis of the second optical system OS2 of the second imaging system IS2 are parallel to each other, the optical axis of the first optical system OS1 and the optical axis of the second optical system OS2 do not coincide with each other.

The first optical system OS1 and the second optical system OS2 are fixed-focus optical systems each having different focal lengths "$f_1$" and "$f_2$". When the first imaging system IS1 is configured, a position (lens position) of the first optical system OS1, that is, a separation distance between the first optical system OS1 and the first image sensor S1 is adjusted so that the first subject image of the subject 100 which is located at an arbitrary distance "$a_{FD1}$" is formed on an imaging surface of the first image sensor S1, that is, the subject 100 which is located at the arbitrary distance "$a_{FD1}$" is in the best focus. Similarly, when the second imaging system IS2 is configured, a position (lens position) of the second optical system OS2, that is, a separation distance between the second optical system OS2 and the second image sensor S2 is adjusted so that the second subject image of the subject 100 which is located at an arbitrary distance "$a_{FD2}$" is formed on an imaging surface of the second image sensor S2, that is, the subject 100 which is located at the arbitrary distance "$a_{FD2}$" is in the best focus.

Further, a distance from an intersection point between the optical axis of the first optical system OS1 and an extended line of a principal ray at an image height of a distance measurement target point of the first subject image in an image space of the first optical system OS1 to an image formation position of the first subject image when the subject 100 is located at the infinite distance point is "$EP_1$". Furthermore, a distance from an intersection point between the optical axis of the second optical system OS2 and an extended line of a principal ray at an image height of a distance measurement target point of the second subject image in an image space of the second optical system OS2 to an image formation position of the second subject image when the subject 100 is located at the infinite distance point is "$EP_2$".

The first optical system OS1 and the second optical system OS2 are configured and arranged so that a difference "D" in the depth direction (optical axis direction) exists between a front principal point (front principal plane) of the first optical system OS1 and a front principal point (front principal plane) of the second optical system OS2. Namely, when a distance (subject distance) from the front principal point of the first optical system OS1 to the distance measurement target point of the subject 100 is defined as "a", a distance from the front principal point of the second optical system OS2 to the distance measurement target point of the subject 100 is "a+D".

By using the similarity relationship described with reference to FIG. 1, a magnification "$m_1$" of the first subject image formed on the imaging surface of the first image sensor S1 by the first optical system OS1 can be calculated according to the following equation (8).

[Equation 8]

$$m_1 = \frac{EP_{FD1}}{EP_{OD1}} \cdot m_{OD1} = \frac{EP_1 + \Delta b_{FD1}}{EP_1 + \Delta b_{OD1}} \cdot m_{OD1} \quad (8)$$

Here, "$EP_{OD1}$" is a distance from the intersection point between the optical axis of the first optical system OS1 and the extended line of the principal ray at the image height of the distance measurement target point of the first subject image in the image space of the first optical system OS1 to an image formation position of the first subject image when the subject 100 is located at the distance "a". "$EP_{FD1}$" is a distance from the intersection point between the optical axis of the first optical system OS1 and the extended line of the principal ray at the image height of the distance measurement target point of the first subject image in the image space of the first optical system OS1 to the imaging surface of the first image sensor S1. A positional relationship between the distance "$EP_{OD1}$" and the distance "$EP_{FD1}$" is determined at the time of configuring the first imaging system IS1 by adjusting the position (lens position) of the first optical system OS1 so that the subject 100 located at the distance "$a_{FD1}$" is in the best focus. Further, "$\Delta b_{OD1}$" is a difference between the focal length "$f_1$" and a distance "$b_{OD1}$" from a rear principal point of the first optical system OS1 to the image formation position of the first subject image when the subject 100 is located at the distance "a". "$\Delta b_{FD1}$" is a difference between the focal length "$f_1$" and a distance "$b_{FD1}$" from the rear principal point of the first optical system OS1 to the imaging surface of the first image sensor S1. "$m_{OD1}$" is a magnification of the first subject image at the image formation position of the first subject image when the subject 100 is located at the distance "a".

Since the above equations (1), (4) and (6) can be applied to the image formation by the first optical system OS1, the above equation (8) can be expressed by the following equation (9).

[Equation 9]

$$m_1 = \left( \frac{f_1^2 - EP_1 \cdot f_1 + EP_1 \cdot a_{FD1}}{a_{FD1} - f_1} \bigg/ \frac{f_1^2 - EP_1 \cdot f_1 + EP_1 \cdot a}{a - f_1} \right) \vee \frac{f_1}{a - f_1} \quad (9)$$

$$= \frac{f_1 \cdot (f_1^2 - EP_1 \cdot f_1 + EP_1 \cdot a_{FD1})}{(a_{FD1} - f_1) \cdot (f_1^2 - EP_1 \cdot f_1 + EP_1 \cdot a)}$$

Here, "$a_{FD1}$" is the distance from the front principal point of the first optical system OS1 to the subject 100 when the first subject image is in the best focus on the imaging surface of the first image sensor S1.

Similarly, a magnification "$m_2$" of the second subject image formed on the imaging surface of the second image sensor S2 by the second optical system OS2 can be calculated according to the following equation (10).

[Equation 10]

$$m_2 = \frac{EP_{FD2}}{EP_{OD2}} \cdot m_{OD2} = \frac{EP_2 + \Delta b_{FD2}}{EP_2 + \Delta b_{OD2}} \cdot m_{OD2}$$

$$= \left( \frac{f_2^2 - EP_2 \cdot f_2 + EP_2 \cdot a_{FD2}}{a_{FD2} - f_2} \bigg/ \frac{f_2^2 - EP_2 \cdot f_2 + EP_2 \cdot (a+D)}{(a+D) - f_2} \right) \cdot \frac{f_2}{(a+D) - f_2}$$

$$= \frac{f_2 \cdot (f_2^2 - EP_2 \cdot f_2 + EP_2 \cdot a_{FD2})}{(a_{FD2} - f_2) \cdot (f_2^2 - EP_2 \cdot f_2 + EP_2 \cdot (a+D))}$$

(10)

Here, "$EP_{OD2}$" is a distance from the intersection point between the optical axis of the second optical system OS2 and the extended line of the principal ray at the image height of the distance measurement target point of the second subject image in the image space of the second optical system OS2 to an image formation position of the second subject image when the subject 100 is located at the distance "a+D". "$EP_{FD2}$" is a distance from the intersection point between the optical axis of the second optical system OS2 and the extended line of the principal ray at the image height of the distance measurement target point of the second subject image in the image space of the second optical system OS2 to the imaging surface of the second image sensor S2. A positional relationship between the distance "$EP_{OD2}$" and the distance "$EP_{FD2}$" is determined at the time of configuring the second imaging system IS2 by adjusting the position (lens position) of the second optical system OS2 so that the subject 100 located at the arbitrary distance "$a_{FD2}$" is in the best focus. In addition, "$\Delta b_{OD2}$" is a difference between the focal length "$f_2$" and a distance "$b_{OD2}$" from the rear principal point of the second optical system OS2 to the image formation position of the second subject image when the subject 100 is located at the distance "a+D". "$\Delta b_{FD2}$" is a difference between the focal length "$f_2$" and a distance "$b_{FD2}$" from the rear principal point of the second optical system OS2 to the imaging surface of the second image sensor S2. "$m_{OD2}$" is a magnification of the second subject image at the image formation position of the second subject image when the subject 100 is located at the distance "a+D". "$a_{FD2}$" is the distance from the front principal point of the second optical system OS2 to the subject 100 when the second subject image is in the best focus on the imaging surface of the second image sensor S2.

Therefore, an image magnification ratio "MR" between the magnification "$m_1$" of the first subject image formed on the imaging surface of the first image sensor S1 by the first optical system OS1 and the magnification "$m_2$" of the second subject image formed on the imaging surface of the second image sensor S2 by the second optical system OS2 can be calculated according to the following equation (11).

[Equation 11]

$$MR = \frac{m_2}{m_1}$$

$$= \frac{f_2}{f_1} \cdot \frac{a_{FD1} - f_1}{a_{FD2} - f_2} \cdot \frac{f_2^2 - EP_2 \cdot f_2 + EP_2 \cdot a_{FD2}}{f_1^2 - EP_1 \cdot f_1 + EP_1 \cdot a_{FD1}} \cdot \frac{f_1^2 - EP_1 \cdot f_1 + EP_1 \cdot a}{f_2^2 - EP_2 \cdot f_2 + EP_2 \cdot (a+D)}$$

$$= K \cdot \frac{f_1^2 - EP_1 \cdot f_1 + EP_1 \cdot a}{f_2^2 - EP_2 \cdot f_2 + EP_2 \cdot (a+D)}$$

(11)

Here, "K" is a coefficient and represented by the following equation (12) constituted of the fixed values "$f_1$", "$f_2$", "$EP_1$", "$EP_2$", "$a_{FD1}$" and "$a_{FD2}$" determined by the configurations of the first imaging system IS1 and the second imaging system IS2.

[Equation 12]

$$K = \frac{f_2}{f_1} \cdot \frac{a_{FD1} - f_1}{a_{FD2} - f_2} \cdot \frac{f_2^2 - EP_2 \cdot f_2 + EP_2 \cdot a_{FD2}}{f_1^2 - EP_1 \cdot f_1 + EP_1 \cdot a_{FD1}}$$

(12)

As is clear from the above equation (11), the image magnification ratio "MR" between the magnification "$m_1$" of the first subject image formed on the imaging surface of the first image sensor S1 by the first optical system OS1 and the magnification "$m_2$" of the second subject image formed on the imaging surface of the second image sensor S2 by the second optical system OS2 changes according to the distance "a" from the front principal point of the first optical system OS1 to the distance measurement target point of the subject 100.

By solving the above equation (11) for the distance "a", the following general equation (13) for the distance "a" to the subject 100 can be obtained.

[Equation 13]

$$a = \frac{K \cdot (f_1^2 - EP_1 \cdot f_1) - MR \cdot (f_2^2 - EP_2 \cdot f_2 + EP_2 \cdot D)}{MR \cdot EP_2 - K \cdot EP_1} \quad (13)$$

In the above equation (13), "$f_1$", "$f_2$", "$EP_1$", "$EP_2$", "D" and "K" are the fixed values determined by the configurations of the first imaging system IS1 and the second imaging system IS2. Thus, if the image magnification ratio "MR" can be obtained, it is possible to calculate the distance "a" from the distance measurement target point of the first optical system OS1 to the distance measurement target point of the subject 100.

Figure 3:
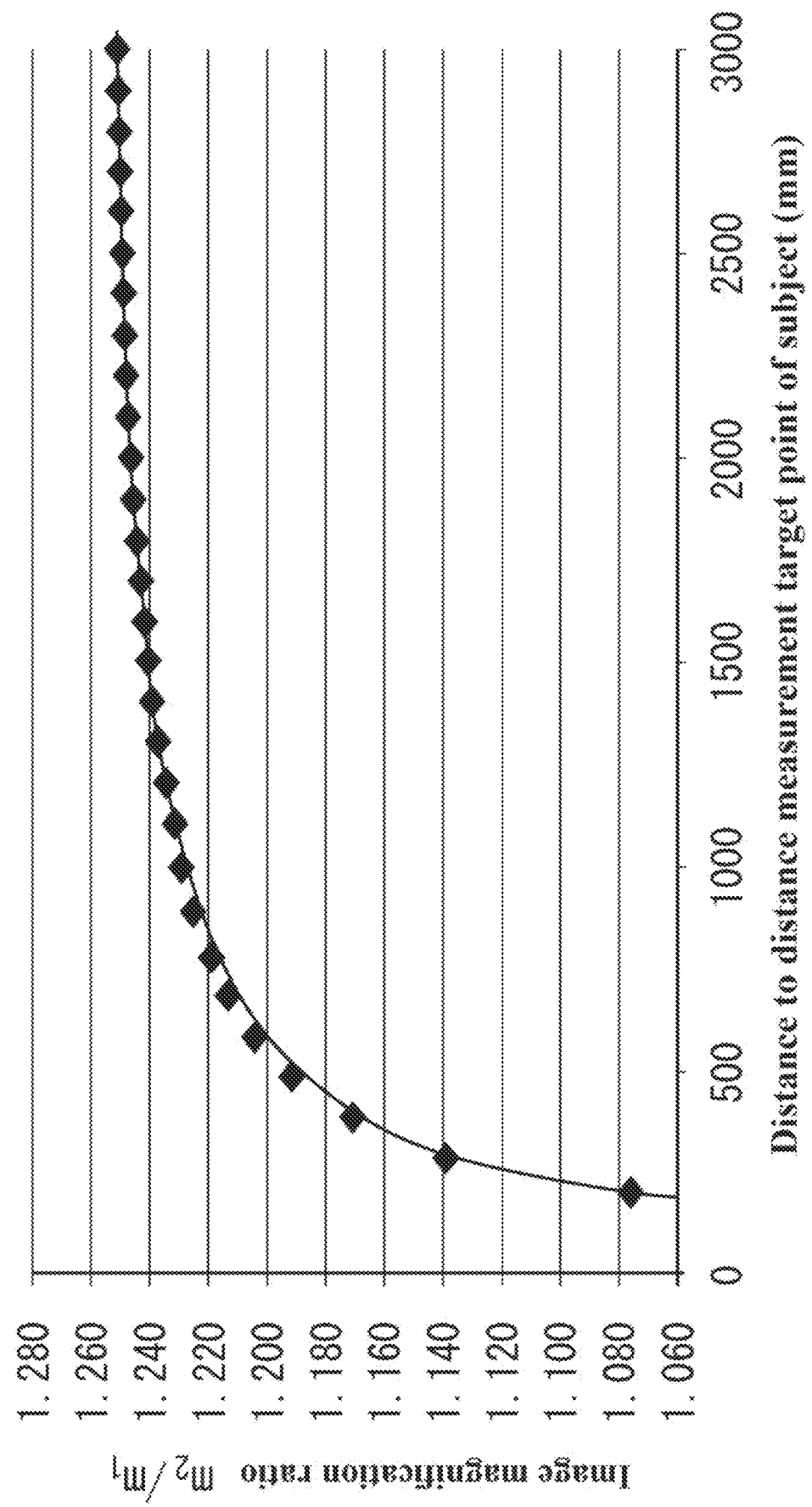
FIG. 3 is a graph for explaining that an image magnification ratio between a magnification of a first subject image formed by a first optical system shown in FIG. 2 and a magnification of a second subject image formed by a second optical system shown in FIG. 2 changes according to a distance to a distance measurement target point of a subject.

FIG. 3 shows an exemplary relationship between the image magnification ratio "MR" of the magnification "$m_1$" of the first subject image formed on the imaging surface of the first image sensor S1 by the first optical system OS1 and the magnification "$m_2$" of the second subject image formed on the imaging surface of the second image sensor S2 by the second optical system OS2 and the distance "a" to the distance measurement target point of the subject 100, which is derived from the above equation (13). As is clear from FIG. 3, one-to-one relationship is established between the value of the image magnification ratio "MR" and the distance "a" to the distance measurement target point of the subject 100. On the other hand, the image magnification ratio "MR" can be calculated according to the following equation (14).

[Equation 14]

$$MR = \frac{m_2}{m_1} = \frac{Y_{FD2}/sz}{Y_{FD1}/sz} = \frac{Y_{FD2}}{Y_{FD1}} \quad (14)$$

Here, "sz" is an actual size (height, that is a distance from the optical axis of the first optical system OS1 in the direction perpendicular to the optical axis of the first optical system OS1) of the distance measurement target point of the subject 100 in the object space. "$Y_{FD1}$" is an image height (distance from the optical axis of the first optical system OS1 in the direction perpendicular to the optical axis of the first optical system OS1) of the distance measurement target point of the first subject image formed on the imaging surface of the first image sensor S1 by the first optical system OS1. "$Y_{FD2}$" is an image height (distance from the optical axis of the second optical system OS2 in the direction perpendicular to the optical axis of the second optical system OS2) of the distance measurement target point of the second subject image formed on the imaging surface of the second image sensor S2 by the second optical system OS2.

The image height "$Y_{FD1}$" of the distance measurement target point of the first subject image and the image height "$Y_{FD2}$" of the distance measurement target point of the second subject image can be actually measured from an image signal of the first subject image and an image signal of the second subject image which are respectively obtained by imaging the first subject image with the first image sensor S1 and imaging the second subject image with the second image sensor S2. Therefore, by actually measuring the image height "$Y_{FD1}$" of the distance measurement target point of the first subject image and the image height "$Y_{FD2}$" of the distance measurement target point of the second subject image from the image signal of the first subject image and the image signal of the second subject image obtained by actually imaging the subject 100 with the first imaging system IS1 and the second imaging system IS2, it is possible to obtain the image magnification ratio "MR" between the magnification "$m_1$" of the first subject image and the magnification "$m_2$" of the second subject image based on the measured image height "$Y_{FD1}$" and the measured image height "$Y_{FD2}$".

The distance measuring camera of the present disclosure obtains the image magnification ratio "MR" between the magnification "$m_1$" of the first subject image and the magnification "$m_2$" of the second subject image from the actually measured image height "$Y_{FD1}$" of the distance measurement target point of the first subject image and the actually measured image height "$Y_{FD2}$" of the distance measurement target point of the second subject image to calculate the distance "a" from the front principal point of the first optical system OS1 to the distance measurement target point of the subject 100 according to the above-described principle.

In this regard, as is clear from the above equation (11), when the focal length "$f_1$" of the first optical system OS1 is equal to the focal length "$f_2$" of the second optical system OS2 ("$f_1$"="$f_2$"), the distance "$EP_1$" from the intersection point between the optical axis of the first optical system OS1 and the extended line of the principal ray at the image height of the distance measurement target point of the first subject image in the image space of the first optical system OS1 to the image formation position of the first subject image when the subject 100 is located at the infinite distance point is equal to the distance "$EP_2$" from the intersection point between the optical axis of the second optical system OS2 and the extended line of the principal ray at the image height of the distance measurement target point of the second subject image in the image space of the second optical system OS2 to the image formation position of the second subject image when the subject 100 is located at the infinite distance point ("$EP_1$"="$EP_2$") and the difference "D" in the depth direction (the optical axis direction) does not exist between the front principal point of the first optical system OS1 and the front principal point of the second optical system OS2 ("D"=0), the image magnification ratio "MR" is not established as the function of the distance "a" and the image magnification ratio "MR" becomes a constant value. In this case, the change of the magnification "$m_1$" of the first subject image according to the distance "a" to the distance measurement target point of the subject 100 becomes the same as the change of the magnification "$m_2$" of the second subject image according to the distance "a" to the distance measurement target point of the subject 100 and thus it becomes impossible to calculate the distance "a" from the first optical system OS1 to the distance measurement target point of the subject 100 based on the image magnification ratio "MR".

Further, as a special condition, even if the conditions of "$f_1$"≠"$f_2$", "$EP_1$"≠"$EP_2$" and "D"=0 are satisfied, in a case of "$f_1$"≠"$EP_1$" and "$f_2$"≠"$EP_2$", the image magnification ratio "MR" is not established as the function of the distance "a" and thus the image magnification ratio "MR" becomes a constant value. In such a special case, it is impossible to calculate the distance "a" from the first optical system OS1 to the distance measurement target point of the subject 100 based on the image magnification ratio "MR".

Therefore, in the distance measuring camera of the present disclosure, the first optical system OS1 and the second optical system OS2 are configured and arranged so that at least one of the following three conditions is satisfied, and thereby the change of the magnification "$m_1$" of the first subject image according to the distance "a" to the distance measurement target point of the subject 100 is different from the change of the magnification "$m_2$" of the second subject image according to the distance "a" to the distance measurement target point of the subject 100.

(First condition) The focal length "$f_1$" of the first optical system OS1 and the focal length "$f_2$" of the second optical system OS2 are different from each other ("$f_1$"≠"$f_2$").

(Second condition) The distance "$EP_1$" from the intersection point between the optical axis of the first optical system OS1 and the extended line of the principal ray at the image height of the distance measurement target point of the first subject image in the image space of the first optical system OS1 to the image formation position of the first subject image when the subject 100 is located at the infinite distance point and the distance "$EP_2$" from the intersection point between the optical axis of the second optical system OS2 and the extended line of the principal ray at the image height of the distance measurement target point of the second subject image in the image space of the second optical system OS2 to the image formation position of the second subject image when the subject 100 is located at the infinite distance point are different from each other ("$EP_1$"≠"$EP_2$").

(Third condition) The difference "D" in the depth direction (the optical axis direction) exists between the front principal point of the first optical system OS1 and the front principal point of the second optical system OS2 ("D"≠0).

In addition, even if at least one of the first to third conditions described above is satisfied, in the above-described special case ("$f_1$"≠"$f_2$", "$EP_1$"≠"$EP_2$", "D"=0, "$f_1$"="$EP_1$" and "$f_2$"="$EP_2$"), the image magnification ratio "MR" is not established as the function of the distance "a" and thus it is impossible to calculate the distance "a" from the first optical system OS1 to the distance measurement target point of the subject 100 based on the image magnification ratio "MR". Therefore, in order to calculate the distance "a" from the first optical system OS1 to the distance measurement target point of the subject 100 based on the image magnification ratio "MR", the distance measuring camera of the present disclosure is configured to further satisfy a fourth condition that the image magnification ratio "MR" is established as the function of the distance "a".

Therefore, it is possible to calculate the distance "a" from the front principal point of the first optical system OS1 to the distance measurement target point of the subject 100 by calculating the image magnification ratio "MR" from the image height "$Y_{FD1}$" of the distance measurement target point of the first subject image and the image height "$Y_{FD2}$" of the distance measurement target point of the second subject image actually measured from the image signal of the first subject image and the image signal of the second subject image obtained by the distance measuring camera of the present disclosure.

In the above-described principle, it is assumed that each of the first optical system OS1 and the second optical system OS2 is an optical system in which vignetting depending on a size and a thickness of lenses, a mechanical aperture stop (a flare cutter) or the like constituting the optical system does not occur. Next, description will be given to a case where the first optical system OS1 is an optical system in which the vignetting occurs depending on the image height of the distance measurement target point of the first subject image corresponding to the distance measurement target point of the subject 100 and the second optical system OS2 is an optical system in which the vignetting occurs depending on the image height of the distance measurement target point of the second subject image corresponding to the distance measurement target point of the subject 100.

Figure 4A:
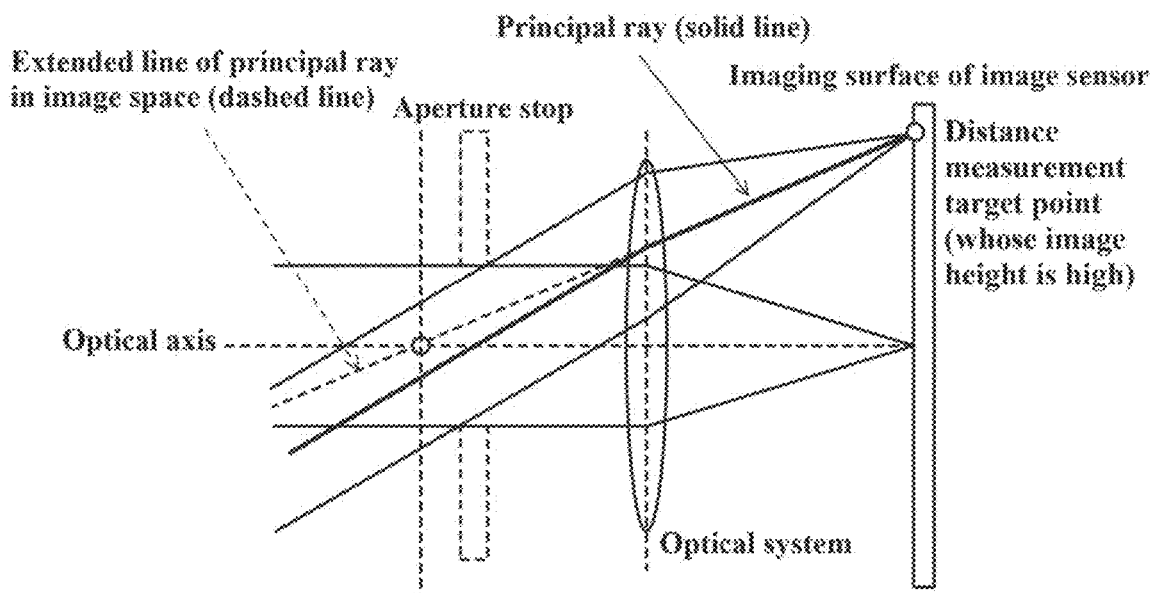
FIGS. 4a-4b are a view for explaining that a position of an intersection point between an optical axis of an optical system and an extended line of a principal ray at each image height in an image space of the optical system does not change and the position of the intersection point coincides with a position of an exit pupil of the optical system in an optical system in which vignetting does not occur.

Regarding the optical system in which the vignetting does not occur, FIG. 4a shows an intersection point between an optical axis of the optical system and an extended line of a principal ray at an image height of a distance measurement target point of a subject image in an image space of the optical system if the image height of the distance measurement target point of the subject image corresponding to the distance measurement target point of the subject 100 is high. Regarding the optical system in which the vignetting does not occur, FIG. 4b shows the intersection point between the optical axis of the optical system and the extended line of the principal ray at the image height of the distance measurement target point of the subject image in the image space of the optical system if the image height of the distance measurement target point of the subject image corresponding to the distance measurement target point of the subject 100 is low.

Figure 4B:
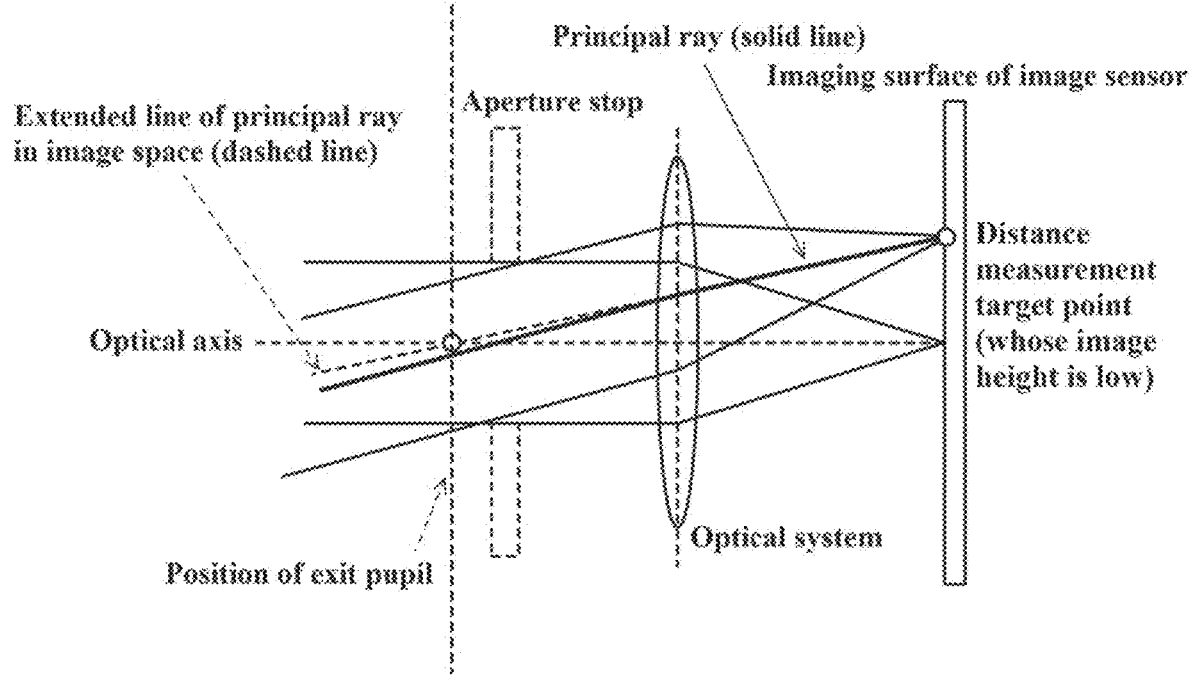

As is clear from FIG. 4a and FIG. 4b, in the case where the vignetting does not occur in the optical system, even if a value of the image height of the distance measurement target point of the subject image corresponding to the distance measurement target point of the subject 100 changes, a position of the intersection point between the optical axis of the optical system and the extended line of the principal ray at the image height of the distance measurement target point of the subject image in the image space of the optical system does not change. Further, the position of the intersection point between the optical axis of the optical system and the extended line of the principal ray at the image height of the distance measurement target point of the subject image in the image space of the optical system coincides with a position of an exit pupil of the optical system. Therefore, if the vignetting does not occur in the first optical system OS1, the distance "$EP_1$" from the intersection point between the optical axis of the first optical system OS1 and the extended line of the principal ray at the image height of the distance measurement target point of the first subject image in the image space of the first optical system OS1 to the image formation position of the first subject image when the subject 100 is located at the infinite distance point is equal to a distance from the exit pupil of the first optical system OS1 to the image formation position of the first subject image when the subject 100 is located at the infinite distance point regardless of the value of the image height of the distance measurement target point of the first subject image in the image space of the first optical system OS1. Similarly, the distance "$EP_2$" from the intersection point between the optical axis of the second optical system OS2 and the extended line of the principal ray at the image height of the distance measurement target point of the second subject image in the image space of the second optical system OS2 to the image formation position of the second subject image when the subject 100 is located at the infinite distance point is equal to a distance from the exit pupil of the second optical system OS2 to the image formation position of the second subject image when the subject 100 is located at the infinite distance point. Thus, if the vignetting does not occur in the first optical system OS1 and the second optical system OS2, even if the value of the image height of the distance measurement target point of each of the first subject image and the second subject image corresponding to the distance measurement target point of the subject 100 changes, the distance "$EP_1$" and the distance "$EP_2$" do not change as described above. Therefore, the distance "$EP_1$" becomes a fixed value determined at the time of configuring and arranging the first optical system OS1 and the distance "$EP_2$" becomes a fixed value determined at the time of configuring and arranging the second optical system OS2. If each of the first optical system OS1 and the second optical system OS2 is the optical system in which the vignetting does not occur, each of the distance "$EP_1$" and the distance "$EP_2$" can be treated as the fixed value which does not change with respect to the image height of the distance measurement target point of each of the first subject image and the second subject image.

Figure 5A:
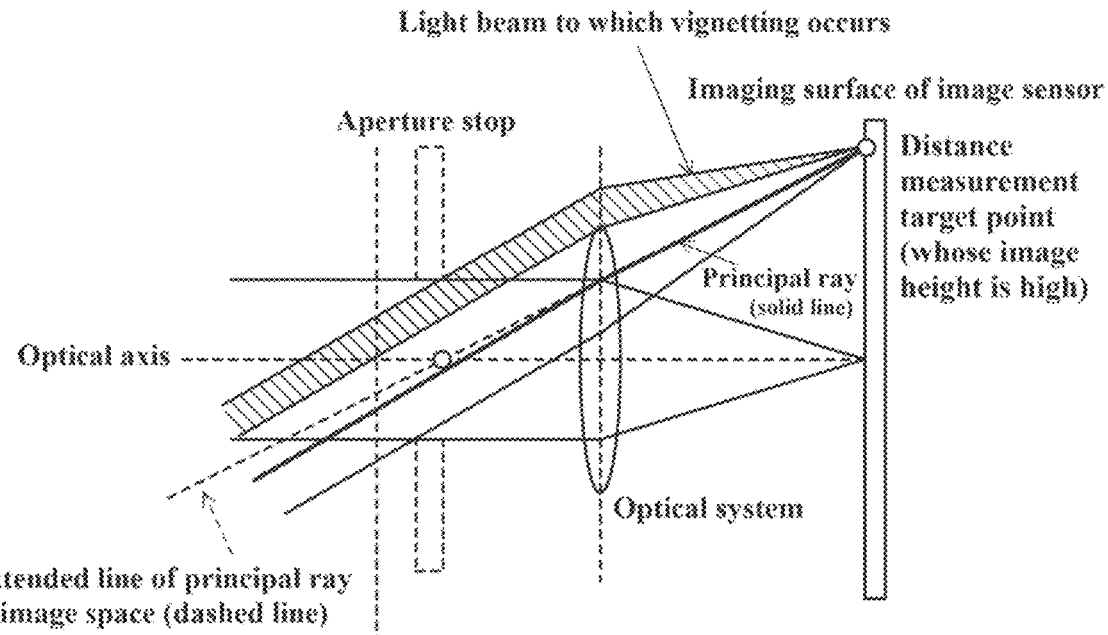
FIGS. 5a-5b are a view for explaining that the position of the intersection point between the optical axis of the optical system and the extended line of the principal ray at an image height in the image space of the optical system changes in the optical system in which the vignetting occurs when a value of the image height in the image space of the optical system changes.
Figure 5B:
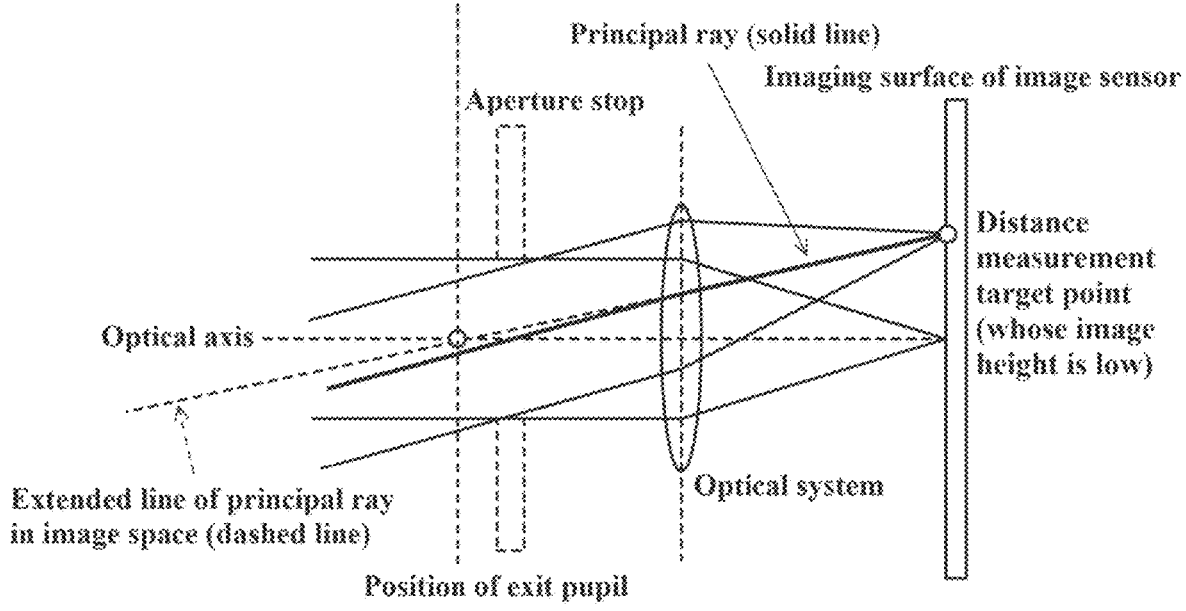

On the other hand, regarding an optical system in which the vignetting occurs depending on the image height of the distance measurement target point of the subject image corresponding to the distance measurement target point of the subject 100, FIG. 5a shows the intersection point between the optical axis of the optical system and the extended line of the principal ray at the image height of the distance measurement target point of the subject image in the image space of the optical system if the image height of the distance measurement target point of the subject image corresponding to the distance measurement target point of the subject 100 is high. Regarding the optical system in which the vignetting occurs depending on the image height of the distance measurement target point of the subject image corresponding to the distance measurement target point of the subject 100, FIG. 5b shows the intersection point between the optical axis of the optical system and the extended line of the principal ray at the image height of the distance measurement target point of the subject image in the image space of the optical system if the image height of the distance measurement target point of the subject image corresponding to the distance target measurement target point of the subject 100 is low. When the image height of the distance measurement target point of the subject image is high as shown in FIG. 5a, the vignetting of light beam is caused by the size and the thickness of the lenses and the mechanical aperture stop (the flare cutter) constituting the optical system. As a result, a peripheral portion of the light beam which is focused on the distance measurement target point of the subject does not pass through the aperture stop and thus a diameter of the light beam which is focused on the distance measurement target point of the subject image changes. As is well known, the principal ray at an arbitrary image height in the image space of the optical system is a central ray of the light beam focused on that image height in the image space. Thus, if the vignetting occurs, the position of the intersection point between the optical axis of the optical system and the extended line of the principal ray at the image height of the distance measurement target point of the subject image in the image space of the optical system changes as shown in FIG. 5a. Therefore, the position of the intersection point between the optical axis of the optical system and the extended line of the principal ray at the image height of the distance measurement target point of the subject image in the image space of the optical system does not coincide with the position of the exit pupil of the optical system any more. On the other hand, since the image height of the distance measurement target point of the subject image corresponding to the distance measurement target point of the subject 100 is low as shown in FIG. 5b, the vignetting does not occur or the vignetting is substantially negligibly small. In this case, the position of the intersection point between the optical axis of the optical system and the extended line of the principal ray at the image height of the distance measurement target point of the subject image in the image space of the optical system coincides or substantially coincides with the position of the exit pupil of the optical system.

As described above, when the vignetting occurs in the optical system depending on the image height of the distance measurement target point of the subject image in the image space of the optical system which corresponds to the distance measurement target point of the subject 100, the position of the intersection point between the optical axis of the optical system and the extended line of the principal ray at the image height of the distance measurement target point of the subject image in the image space of the optical system changes depending on the image height of the distance measurement target point of the subject image in the image space of the optical system. For instance, as the image height of the distance measurement target point of the subject image increases, a difference between the position of the exit pupil of the optical system and the position of the intersection point between the optical axis of the optical system and the extended line of the principal ray at the image height of the distance measurement target point of the subject image in the image space of the optical system increases. Therefore, if the distance "$EP_1$" and the distance "$EP_2$" used in the above general equation (13) for calculating the distance "a" to the distance measurement target point of the subject based on the image magnification ratio "MR" are treated as the fixed values which do not change depending on the image height of the distance measurement target point of each of the first subject image and the second subject image, an error between the calculated distance "a" to the distance measurement target point of the subject and the actual distance "a" to the distance measurement target point of the subject increases as the image height of the distance measurement target point of the subject image corresponding to the distance measurement target point of the subject 100 increases.

For the reason stated above, the distance measuring camera of the present disclosure is configured to treat the distance "$EP_1$" used in the general equation (13) as a variable which can change depending on the image height of the distance measurement target point of the first subject image and does not treat the distance "$EP_1$" as a fixed value which does not change depending on the image height of the distance measurement target point of the first subject image. Similarly, the distance measuring camera of the present disclosure is configured to treat the distance "$EP_2$" as a variable which can change depending on the image height of the distance measurement target point of the second subject image and does not treat the distance "$EP_2$" as a fixed value which does not change depending on the image height of the distance measurement target point of the second subject image. With this configuration, even if the image height of the distance measurement target point of each of the first subject image and the second subject image corresponding to the distance measurement target point of the subject 100 is high, it is possible to accurately measure the distance "a" to the distance measurement target point of the subject 100.

Hereinafter, the distance measuring camera of the present disclosure for calculating the distance "a" from the front principal point of the first optical system OS1 to the distance measurement target point of the subject 100 using the above-described principle will be described in detail with reference to certain embodiments shown in the accompanying drawings.

First Embodiment

Figure 6:
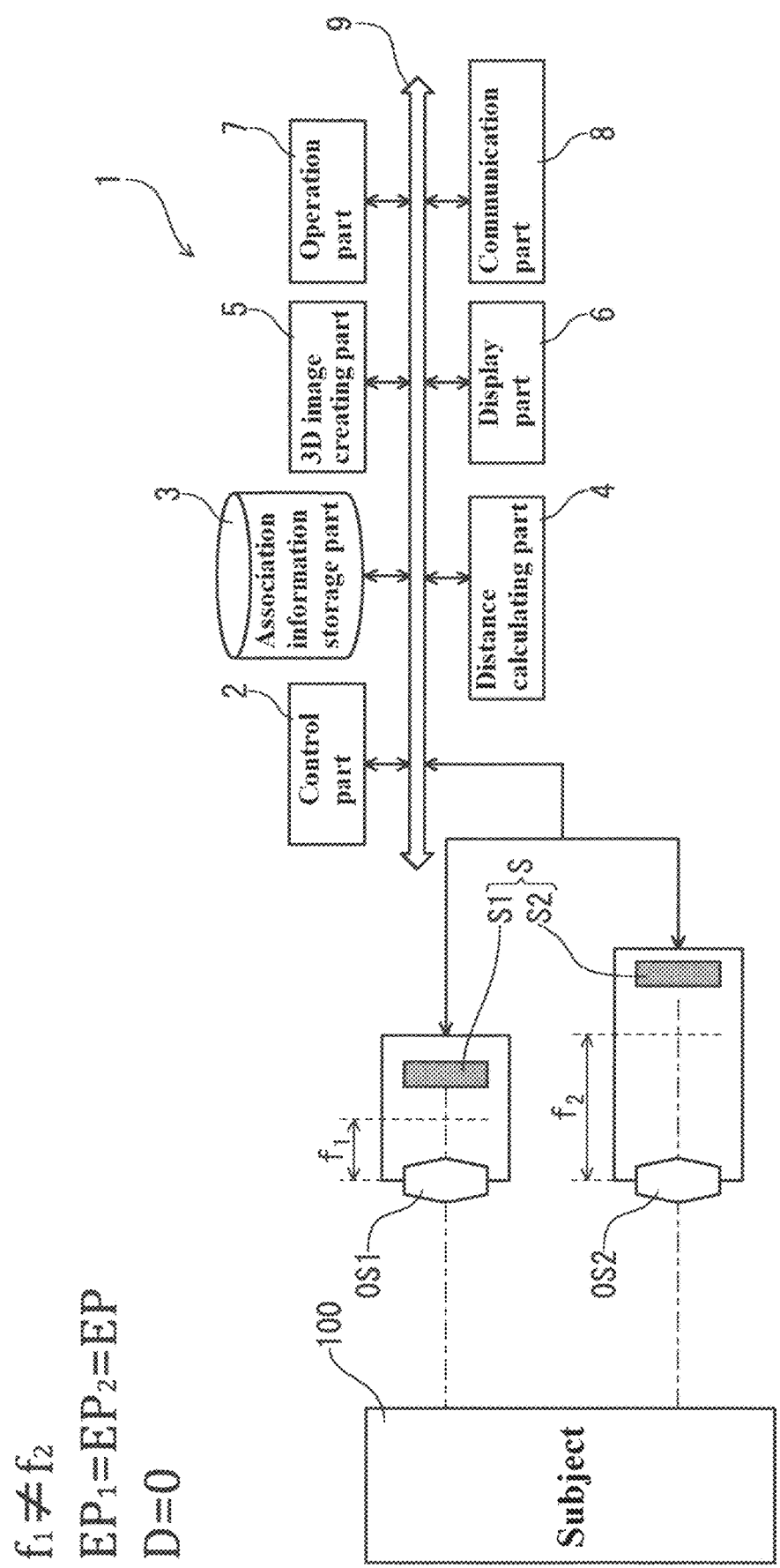
FIG. 6 is a block diagram schematically showing the distance measuring camera according to a first embodiment of the present disclosure.

First, a distance measuring camera 1 according to a first embodiment of the present disclosure will be described in detail with reference to FIG. 6. FIG. 6 is a block diagram schematically showing the distance measuring camera according to the first embodiment of the present disclosure.

The distance measuring camera 1 shown in FIG. 6 has a function of calculating a distance "a" to a distance measurement target point of a subject 100. The distance measuring camera 1 includes a control part 2 for performing control of the distance measuring camera 1, a first optical system OS1 for collecting light from the subject 100 to form a first subject image, a second optical system OS2 for collecting the light from the subject 100 to form a second subject image, an imaging part S for imaging the first subject image formed by the first optical system OS1 and the second subject image formed by the second optical system OS2, an association information storage part 3 storing association information for associating an image magnification ratio "MR" between a magnification "$m_1$" of the first subject image and a magnification "$m_2$" of the second subject image with the distance "a" to the distance measurement target point of the subject 100, a distance calculating part 4 for performing calculation depending on image heights of distance measurement target points of the first subject image and the second subject image corresponding to the distance measurement target point of the subject 100 to calculate the distance "a" to the distance measurement target point of the subject 100 based on the first subject image and the second subject image imaged by the imaging part S, a three-dimensional (3D) image creating part 5 for creating a three-dimensional image of the subject 100 based on the first subject image or the second subject image imaged by the imaging part S and the distance "a" to the distance measurement target point of the subject 100 calculated by the distance calculating part 4, a display part 6 such as a liquid crystal panel for displaying arbitrary information, an operation part 7 for inputting an operation from a user, a communication part 8 for performing communication with external devices and a data bus 9 for transmitting and receiving data among components of the distance measuring camera 1.

The distance measuring camera 1 of the present embodiment is characterized in that the first optical system OS1 and the second optical system OS2 are configured so as to satisfy the first condition that the focal length "$f_1$" of the first optical system OS1 and the focal length "$f_2$" of the second optical system OS2 are different from each other ("$f_1$"≠"$f_2$") among the above-described three conditions required for calculating the distance "a" to the distance measurement target point of the subject 100 based on the image magnification ratio "MR". On the other hand, in the present embodiment, the first optical system OS1 and the second optical system OS2 are configured and arranged so as not to satisfy the other two conditions ("$EP_1$"≠"$EP_2$" and "D"≠0) among the above-described three conditions. Further, the distance measuring camera 1 of the present embodiment is configured so as to satisfy the fourth condition that the image magnification ratio "MR" is established as the function of the distance "a".

Therefore, the above-described general equation (13) for calculating the distance "a" to the distance measurement target point of the subject 100 using the image magnification ratio "MR" is simplified by the conditions of "$EP_1$"="$EP_2$"="EP" and "D"=0 and thus can be expressed by the following equation (15).

[Equation 15]

$$a = \frac{K \cdot (f_1^2 - EP_1 \cdot f_1) - MR \cdot (f_2^2 - EP_2 \cdot f_2)}{EP \cdot (MR - K)} \quad (15)$$

Here, the coefficient "K" is expressed by the following equation (16).

[Equation 16]

$$K = \frac{f_2}{f_1} \cdot \frac{a_{FD1} - f_1}{a_{FD2} - f_2} \cdot \frac{f_2^2 - EP \cdot f_2 + EP \cdot a_{FD2}}{f_1^2 - EP \cdot f_1 + EP \cdot a_{FD1}} \quad (16)$$

The distance measuring camera 1 of the present embodiment calculates the image magnification ratio "MR" between the magnification "$m_1$" of the first subject image and the magnification "$m_2$" of the second subject image by imaging the subject 100 with the imaging part S to calculate the distance "a" to the distance measurement target point of the subject 100 according to the above equation (15).

Hereinafter, each component of the distance measuring camera 1 will be described in detail. The control part 2 transmits and receives various data and various instructions to and from the respective components through the data bus 9 to perform the control of the distance measuring camera 1. The control part 2 includes a processor for executing arithmetic processing and a memory storing data, programs, modules and the like required for performing the control of the distance measuring camera 1. The processor of the control part 2 can perform the control of the distance measuring camera 1 by using the data, the programs, the modules and the like stored in the memory. Further, the processor of the control part 2 can provide a desired function by using each component of the distance measuring camera 1. For example, the processor of the control part 2 can use the distance calculating part 4 to perform processing for calculating the distance "a" to the distance measurement target point of the subject 100 based on the first subject image and the second subject image imaged by the imaging part S.

For example, the processor of the control part 2 is one or more operation units such as microprocessors, microcomputers, microcontrollers, digital signal processors (DSPs), central processing units (CPUs), memory control units (MCUs), graphic processing units (GPUs), state machines, logic circuitries, application specific integrated circuits (ASICs) and combinations thereof that can perform operational processes such as signal manipulation based on computer-readable instructions. Among other capabilities, the processor of the control part 2 is configured to fetch computer-readable instructions (such as data, programs and modules) stored in the memory of the control part 2 to perform signal manipulation and signal control.

The memory of the control part 2 is a removable or non-removable computer-readable medium containing volatile memories (such as RAMs, SRAMs and DRAMs), non-volatile memories (such as ROMs, EPROMs, EEPROM, flash memories, hard disks, optical discs, CD-ROMs, digital versatile discs (DVDs), magnetic cassettes, magnetic tapes and magnetic disks) and combinations thereof.

The first optical system OS1 has a function of collecting the light from the subject 100 to form the first subject image on an imaging surface of a first image sensor S1 of the imaging part S. The second optical system OS2 has a function of collecting the light from the subject 100 to form the second subject image on an imaging surface of a second image sensor S2 of the imaging part S. Each of the first optical system OS1 and the second optical system OS2 is constituted of one or more lenses and one or more optical elements such as an aperture stop. Further, although an optical axis of the first optical system OS1 and an optical axis of the second optical system OS2 are parallel to each other, the optical axis of the first optical system OS1 and the optical axis of the second optical system OS2 do not coincide with each other as illustrated.

Further, the first optical system OS1 is an optical system in which the vignetting occurs depending on the image height of the distance measurement target point of the first subject image corresponding to the distance measurement target point of the subject 100, and thereby a position of an intersection point between the optical axis of the first optical system and an extended line of a principal ray at the image height of the distance measurement target point of the first subject image in the image space of the first optical system OS1 changes depending on the image height of the distance measurement target point of the first subject image. Similarly, the second optical system OS2 is an optical system in which the vignetting occurs depending on the image height of the distance measurement target point of the second subject image corresponding to the distance measurement target point of the subject 100, and thereby a position of an intersection point between the optical axis of the optical system and an extended line of a principal ray at the image height of the distance measurement target point of the second subject image in the image space of the second optical system OS2 changes depending on the image height of the distance measurement target point of the second subject image.

As described above, the first optical system OS1 and the second optical system OS2 are configured so that the focal length "$f_1$" of the first optical system OS1 and the focal length "$f_2$" of the second optical system OS2 are different from each other ("$f_1$"≠"$f_2$"). With this configuration, the first optical system OS1 and the second optical system OS2 are configured so that a change of the magnification "$m_1$" of the first subject image formed by the first optical system OS1 according to the distance "a" to the distance measurement target point of the subject 100 is different from a change of the magnification "$m_2$" of the second subject image formed by the second optical system OS2 according to the distance "a" to the distance measurement target point of the subject 100.

In this regard, the configurations and the arrangements of the first optical system OS1 and the second optical system OS2 in the present embodiment may be any aspect as long as the first condition ("$f_1$"≠"$f_2$") described above is satisfied, and thereby the change of the magnification "$m_1$" of the first subject image according to the distance "a" to the distance measurement target point of the subject 100 and the change of the magnification "$m_2$" of the second subject image according to the distance "a" to the distance measurement target point of the distance measurement target point of the subject 100 are different from each other.

The imaging part S has a function of imaging the first subject image formed by the first optical system OS1 and the second subject image formed by the second optical system OS2 to obtain an image signal of the first subject image and an image signal of the second subject image. In the present embodiment, the imaging part S includes the first image sensor S1 for imaging the first subject image to obtain the image signal of the first subject image and the second image sensor S2 for imaging the second subject image to obtain the image signal of the second subject image.

Although the first image sensor S1 and the first optical system OS1 are provided in one housing and the second image sensor S2 and the second optical system OS2 are provided in another housing in the illustrated aspect, the present disclosure is not limited thereto. The scope of the present disclosure involves an aspect in which the first optical system OS1, the second optical system OS2, the first image sensor S1 and the second image sensor S2 are provided in one housing.

Each of the first image sensor S1 and the second image sensor S2 may be a color image sensor such as a CMOS image sensor or a CCD image sensor having a color filter such as an RGB primary color filter and a CMY complementary color filter arranged in any pattern such as a bayer arrangement or a monochrome image sensor having no color filter.

The first subject image is formed on the imaging surface of the first image sensor S1 by the first optical system OS1 and then the color or monochrome image signal of the first subject image is obtained by the first image sensor S1. The obtained image signal of the first subject image is transmitted to the control part 2 and the distance calculating part 4 through the data bus 9. Similarly, the second subject image is formed on the imaging surface of the second image sensor S2 by the second optical system OS2 and then the color or monochrome image signal of the second subject image is obtained by the second image sensor S2. The obtained image signal of the second subject image is transmitted to the control part 2 and the distance calculating part 4 through the data bus 9. The image signal of the first subject image and the image signal of the second subject image transmitted to the distance calculating part 4 are used for calculating the distance "a" to the distance measurement target point of the subject 100. On the other hand, the image signal of the first subject image and the image signal of the second subject image transmitted to the control part 2 are used for image displaying with the display part 6 and the communication of the image signals with the communication part 8.

The association information storage part 3 is an arbitrary non-volatility storage medium (such as a hard disk and a flash memory) for storing the association information for associating the image magnification ratio "MR" ("$m_2$"/"$m_1$") between the magnification "$m_1$" of the first subject image and the magnification "$m_2$" of the second subject image with the distance (subject distance) "a" from the front principal point of the first optical system OS1 to the distance measurement target point of the subject 100. The association information stored in the association information storage part 3 is information for calculating the distance "a" to the distance measurement target point of the subject 100 from the image magnification ratio "MR" ("$m_2$"/"$m_1$") between the magnification "$m_1$" of the first subject image and the magnification "$m_2$" of the second subject image.

Typically, the association information stored in the association information storage part 3 contains the above equation (15) (or the general equation (13)) for calculating the distance "a" to the distance measurement target point of the subject 100 based on the image magnification ratio "MR", the above-described fixed values in the equation determined by the configurations and the arrangements of the first optical system OS1 and the second optical system OS2 (for example, the fixed values "$f_1$", "$f_2$" and "K" for the above equation (15)), information for identifying the distance "$EP_1$" depending on the image height of the distance measurement target point of the first subject image and information for identifying the distance "$EP_2$" depending on the image height of the distance measurement target point of the second subject image.

For instance, each of the first optical system OS1 and the second optical system OS2 in the distance measuring camera 1 of the present disclosure is the optical system in which the vignetting occurs. Thus, the distance "$EP_1$" from the intersection point between the optical axis of the first optical system OS1 and the extended line of the principal ray at the image height of the distance measurement target point of the first subject image in the image space of the first optical system OS1 to the image formation position of the first subject image when the subject 100 is located at the infinite distance point is a variable which can vary depending on the image height of the distance measurement target point of the first subject image in the image space of the first optical system OS1. Similarly, the distance "$EP_2$" from the intersection point between the optical axis of the second optical system OS2 and the extended line of the principal ray at the image height of the distance measurement target point of the second subject image in the image space of the second optical system OS2 to the image formation position of the second subject image when the subject 100 is located at the infinite distance point is a variable which can vary depending on the image height of the distance measurement target point of the second subject image in the image space of the second optical system OS2. A value of the distance "$EP_1$" corresponding to each image height of the distance measurement target point of the first subject image is simulated in advance or measured at the time of configuring the first optical system OS1 and a look-up table or a mathematical expression, which are obtained from the simulation or the measurement for the value of the distance "$EP_1$", for uniquely identifying the value of the distance "$EP_1$" from the image height of the distance measurement target point of the first subject image which is stored in the association information storage part 3 as one of the association information. Similarly, a value of the distance "$EP_2$" corresponding to each image height of the distance measurement target point of the second subject image is simulated in advance or measured at the time of configuring the second optical system OS2 and a look-up table or a mathematical expression, which are obtained from the simulation or the measurement for the value of the distance "$EP_2$", for uniquely identifying the value of the distance "$EP_2$" from the image height of the distance measurement target point of the second subject image is stored in the association information storage part 3 as another one of the association information. By referring to the association information described above, it is possible to uniquely identify the value of the distance "$EP_1$" from the actually-measured image height "$Y_{FD1}$" of the distance measurement target point of the first subject image. Similarly, it is possible to uniquely identify the value of the distance "$EP_2$" from the actually-measured image height "$Y_{FD2}$" of the distance measurement target point of the second subject image. By referring to the above-described associated information stored in the association information storage part 3, it is possible to calculate the distance "a" to the distance measurement target point of the subject 100 based on the image magnification ratio "MR".

The distance calculating part 4 has a function of performing the calculation depending on the image heights of the distance measurement target points of the first subject image and the second subject image corresponding to the distance measurement target point of the subject 100 to calculate the distance "a" to the distance measurement target point of the subject 100 based on the first subject image and the second subject image imaged by the imaging part. More specifically, the distance calculating part 4 calculates the image height "$Y_{FD1}$" of the distance measurement target point of the first subject image from the image signal of the first subject image and identifies the value of the distance "$EP_1$" from the calculated image height "$Y_{FD1}$" of the distance measurement target point of the first subject image. Similarly, the distance calculating part 4 calculates the image height "$Y_{FD2}$" of the distance measurement target point of the second subject image from the image signal of the second subject image and identifies the value of the distance "$EP_2$" from the calculated image height "$Y_{FD2}$" of the distance measurement target point of the second subject image. Thereafter, the distance calculating part 4 refers to the associated information stored in the association information storage part 3, the value of the distance "$EP_1$" identified from the image height "$Y_{FD1}$" of the distance measurement target point of the first subject image and the value of the distance "$EP_2$" identified from the image height "$Y_{FD2}$" of the distance measurement target point of the second subject image to calculate the distance "a" to the distance measurement target point of the subject 100 based on the image magnification ratio "MR" between the magnification "$m_1$" of the first subject image and the magnification "$m_2$" of the second subject image. Hereinafter, description will be given to the process performed by the distance calculating part 4.

First, the distance calculating part 4 receives the image signal of the first subject image from the first image sensor S1 of the imaging part S and receives the image signal of the second subject image from the second image sensor S2 of the imaging part S. After that, the distance calculating part 4 subjects a filtering process such as a Canny method to the image signal of the first subject image and the image signal of the second subject image to extract the distance measurement target point of the first subject image in the image signal of the first subject image and the distance measurement target point of the second subject image in the image signal of the second subject image. The distance calculating part 4 calculates the image height (the distance from the optical axis of the first optical system OS1 in the direction perpendicular to the optical axis of the first optical system OS1) "$Y_{FD1}$" of the distance measurement target point of the first subject image based on a distance from the extracted distance measurement target point of the first subject image and a pixel corresponding to the optical axis of the first optical system OS1 in the image signal of the first subject image. Further, the distance calculating part 4 calculates the image height (the distance from the optical axis of the second optical system OS2 in the direction perpendicular to the optical axis of the second optical system OS2) "$Y_{FD2}$" of the distance measurement target point of the second subject image based on a distance from the extracted distance measurement target point of the second subject image and a pixel corresponding to the optical axis of the second optical system OS2 in the image signal of the second subject image.

After that, the distance calculating part 4 refers to the look-up table or the mathematical expression for uniquely identifying the value of the distance "$EP_1$" from the image height "$Y_{FD1}$" of the distance measurement target point of the first subject image which is stored in the association information storage part 3 as one of the association information to identify the value of the distance "$EP_1$" from the calculated image height "$Y_{FD1}$" of the distance measurement target point of the first subject image. Similarly, the distance calculating part 4 refers to the look-up table or the mathematical expression for uniquely identifying the value of the distance "$EP_2$" from the image height "$Y_{FD2}$" of the distance measurement target point of the second subject image which is stored in the association information storage part 3 as one of the association information to identify the value of the distance "$EP_2$" from the calculated image height "$Y_{FD2}$" of the distance measurement target point of the second subject image. After that, the distance calculating part 4 calculates the image magnification ratio "MR" between the magnification "$m_1$" of the first subject image and the magnification "$m_2$" of the second subject image according to the above-described equation (14) ("MR"="$Y_{FD2}$"/"$Y_{FD1}$") from the calculated image height "$Y_{FD1}$" of the distance measurement target point of the first subject image and the calculated image height "$Y_{FD2}$" of the distance measurement target point of the second subject image. When the image magnification ratio "MR" is calculated, the distance calculating part 4 refers to the association information stored in the association information storage part 3, the value of the distance "$EP_1$" identified from the image height "$Y_{FD1}$" of the distance measurement target point of the first subject image and the value of the distance "$EP_2$" identified from the image height "$Y_{FD2}$" of the distance measurement target point of the second subject image to calculate (identify) the distance "a" to the distance measurement target point of the subject 100 based on the image magnification "MR".

As described above, the distance calculating part 4 is configured to perform the calculation of the above equation (15) (or the general equation (13)) with the distance "$EP_1$" depending on the image height of the distance measurement target point of the first subject image corresponding to the distance measurement target point of the subject 100 and the distance "$EP_2$" depending on the image height of the distance measurement target point of the second subject image corresponding to the distance measurement target point of the subject 100 to calculate the distance "a" to the distance measurement target point of the subject 100. The distance calculating part 4 performs the calculation with the distance "$EP_1$" and the distance "$EP_2$" depending on the image heights of the distance measurement target points of the first subject image and the second subject image corresponding to the distance measurement target point of the subject 100 to calculate (identify) the distance "a" to the distance measurement target point of the subject 100 based on the image magnification ratio "MR". Therefore, even when each of the first optical system OS1 and the second optical system OS2 is the optical system in which the vignetting occurs depending on the image height of the distance measurement target point of the subject image and the image heights of the distance measurement target points of the first subject image and the second subject image corresponding to the distance measurement target point of the subject 100 are high, the distance calculating part 4 can accurately calculate the distance "a" to the distance measurement target point of the subject 100.

The three-dimensional image creating part 5 has a function of creating the three-dimensional image of the subject 100 based on the distance "a" to the distance measurement target point of the subject 100 calculated by the distance calculating part 4 and a two-dimensional image of the subject 100 (that is the image signal of the first subject image or the image signal of the second subject image) obtained by the imaging part S. The words of "the three-dimensional image of the subject 100" used in the specification means data in which the calculated distances "a" to one or more distance measurement target points of the subject 100 are associated with corresponding pixels of the color or monochrome two-dimensional image (the normal image) of the subject 100.

The display part 6 is panel type display means such as a liquid crystal display part. The display part 6 displays various information containing an image such as the two-dimensional image of the subject 100 (the image signal of the first subject image or the image signal of the second subject image) obtained by the imaging part S and the three-dimensional image of the subject 100 created by the three-dimensional image creating part 5, the distance "a" to the distance measurement target point of the subject 100 calculated by the distance calculating part 4 and information required for operating the distance measuring camera 1 in the form of characters or images in accordance with the control from the processor of the control part 2.

The operation part 7 is used for performing operations by the user of the distance measuring camera 1. The operation part 7 is not particularly limited to a specific kind as long as the user of the distance measuring camera 1 can use the operation part 7 to perform the operations. For example, it is possible to employ a mouse, a keyboard, a numeric keypad, a button, a dial, a lever, a touch panel or the like as the operation part 7. The operation part 7 transmits signals respectively corresponding to the operations from the user using the distance measuring camera 1 to the processor of the control part 2.

The communication part 8 has a function of inputting data into the distance measuring camera 1 and/or outputting data from the distance measuring camera 1 to external devices. The communication part 8 may be configured to be connectable to a network such as the Internet. In this case, the distance measuring camera 1 can use the communication part 8 to perform communication with the external devices such as a web server and a data server provided outside the distance measuring camera 1.

As described above, in the distance measuring camera 1 of the present embodiment, the first optical system OS1 and the second optical system OS2 are configured so that the focal length "$f_1$" of the first optical system OS1 and the focal length "$f_2$" of the second optical system OS2 are different from each other ("$f_1$"≠"$f_2$"), and thereby the change of the magnification "$m_1$" of the first subject image with respect to the distance "a" to the distance measurement target point of the subject 100 and the change of the magnification "$m_2$" of the second subject image with respect to the distance "a" to the distance measurement target point of the subject 100 are different from each other. Therefore, the distance measuring camera 1 of the present embodiment can uniquely calculate the distance "a" to the distance measurement target point of the subject 100 based on the image magnification ratio "MR" ("$m_2$"/"$m_1$") between the magnification "$m_1$" of the first subject image and the magnification "$m_2$" of the second subject image.

Second Embodiment

Figure 7:
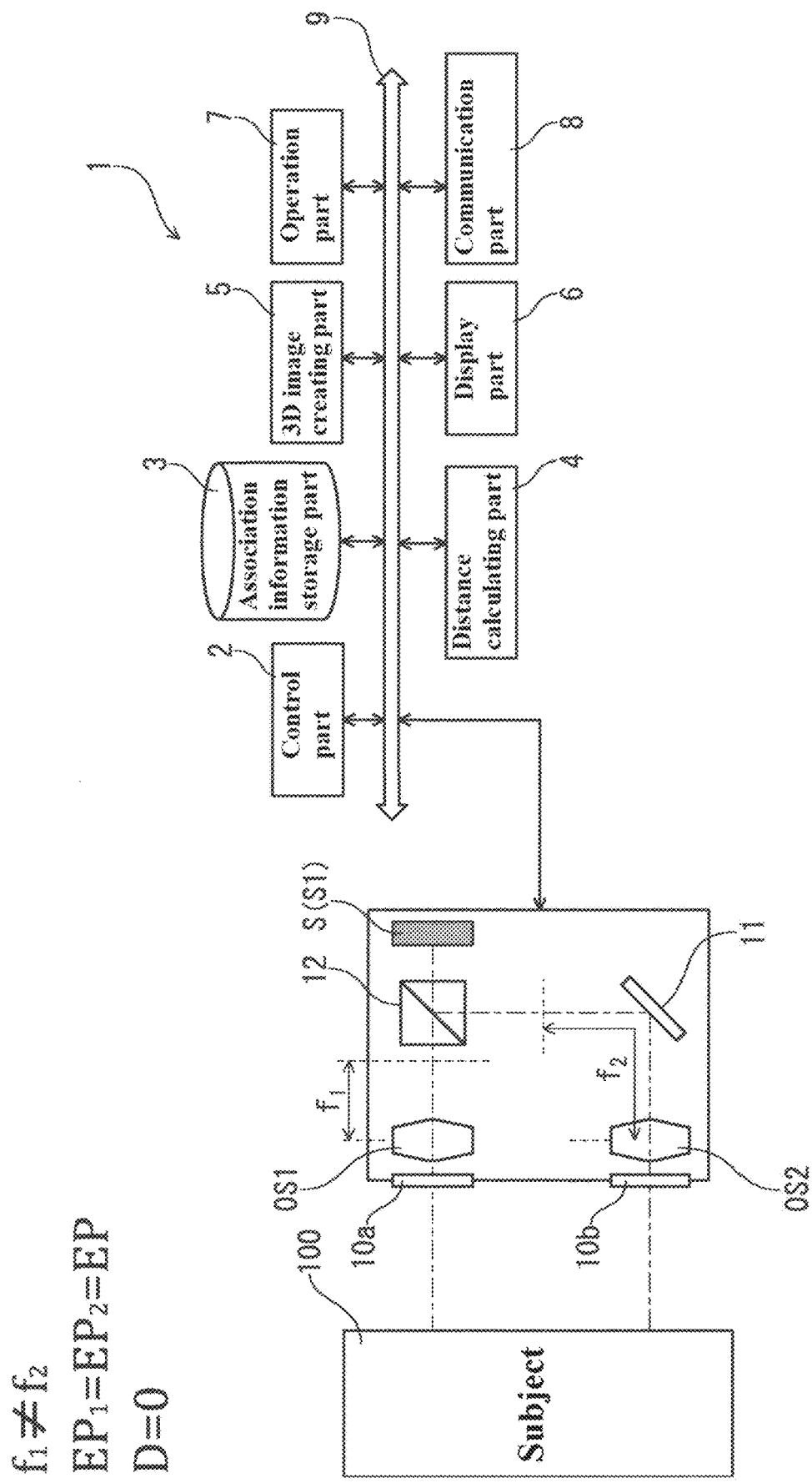
FIG. 7 is a block diagram schematically showing a distance measuring camera according to a second embodiment of the present disclosure.

Next, a distance measuring camera 1 according to a second embodiment of the present disclosure will be described in detail with reference to FIG. 7. FIG. 7 is a block diagram schematically showing the distance measuring camera according to the second embodiment of the present disclosure.

Hereinafter, the distance measuring camera 1 of the second embodiment will be described by placing emphasis on the points differing from the distance measuring camera 1 of the first embodiment with the same matters being omitted from the description. The distance measuring camera 1 of the second embodiment has the same configuration as the configuration of the distance measuring camera 1 of the first embodiment except that the imaging part S is constituted of only the first image sensor S1, the first optical system OS1 and the second optical system OS2 are provided in one housing, and a first shutter 10a, a second shutter 10b, a mirror 11 and a prism 12 are provided in the one housing.

As shown in FIG. 7, the first optical system OS1 and the second optical system OS2 in the present embodiment are arranged in the one housing. Further, the first shutter 10a for blocking incidence of the light from the subject 100 to the first optical system OS1 is arranged on the front side of the first optical system OS1 (on the subject side) and the second shutter 10b for blocking incidence of the light from the subject 100 to the second optical system OS2 is arranged on the front side of the second optical system OS2.

The first shutter 10a and the second shutter 10b are controlled by the processor of the control part 2 and opened and closed in accordance with the signal from the processor of the control part 2. The first shutter 10a and the second shutter 10b are controlled so that only one of them is opened. Thus, both of the first shutter 10a and the second shutter 10b are not opened at the same time.

Further, the mirror 11 and the prism 12 are arranged on an optical path of the light collected by the second optical system OS2. The light passing through the second shutter 10b and collected by the second optical system OS2 passes through the mirror 11 and the prism 12 and reaches the imaging surface of the first image sensor S1. Thus, the second subject image is formed on the imaging surface of the first image sensor S1. As shown in the drawing, in the present embodiment, the optical axis of the first optical system OS1 and the optical axis of the second optical system OS2 coincide with each other in a section from the prism 12 to the first image sensor S1. However, in other sections, for example, in a section from the subject 100 to the first optical system OS1 or the second optical system OS2, the optical axis of the first optical system OS1 and the optical axis of the second optical system OS2 do not coincide with each other.

When the first shutter 10a is opened, the light from the subject 100 enters to the first optical system OS1 and thus the first subject image is formed on the imaging surface of the first image sensor S1. At this time, the first image sensor S1 obtains the image signal of the first subject image and transmits the image signal of the first subject image to the control part 2 and the distance calculating part 4.

On the other hand, when the second shutter 10b is opened, the light from the subject 100 enters to the second optical system OS2 and passes through the mirror 11 and the prism 12, and the second subject image is formed on the imaging surface of the first image sensor S1. At this time, the first image sensor S1 obtains the image signal of the second subject image and transmits the image signal of the second subject image to the control part 2 and the distance calculating part 4.

Thus, in the present embodiment, either one of the first shutter 10a and the second shutter 10b is opened due to the control from the processor of the control part 2. With this control, the distance measuring camera 1 can separately obtain the image signal of the first subject image and the image signal of the second subject image.

According to the present embodiment, it is also possible to provide the same effects as those of the above-described first embodiment. Further, in the present embodiment, it is possible to configure the imaging part S with the single image sensor (the first image sensor S1) which can image both of the first subject image formed by the first optical system OS1 and the second subject image formed by the second optical system OS2. Thus, it is possible to reduce the size and the cost of the distance measuring camera 1.

Third Embodiment

Figure 8:
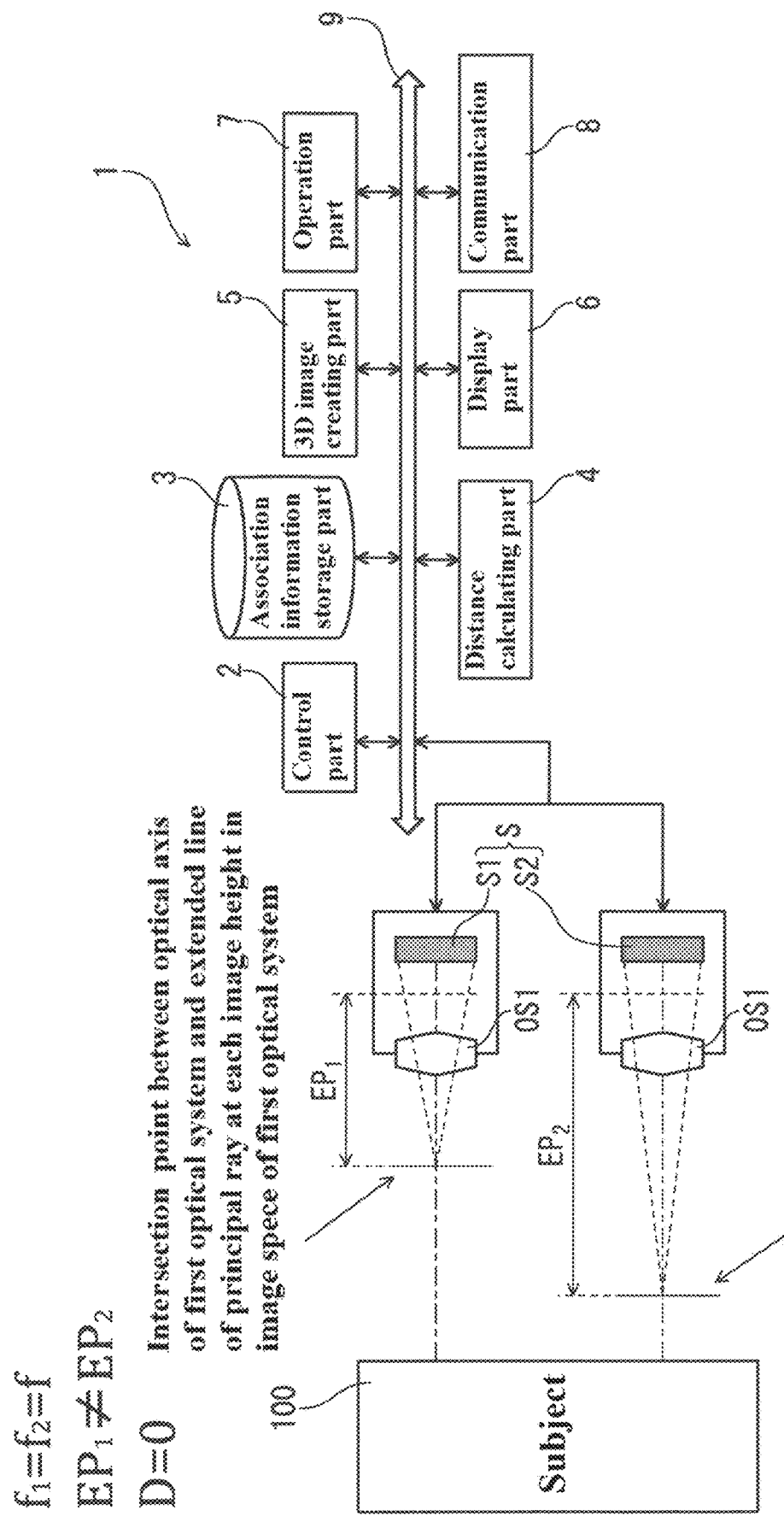
FIG. 8 is a block diagram schematically showing a distance measuring camera according to a third embodiment of the present disclosure.

Next, a distance measuring camera 1 according to a third embodiment of the present disclosure will be described in detail with reference to FIG. 8. FIG. 8 is a block diagram schematically showing the distance measuring camera according to the third embodiment of the present disclosure.

Hereinafter, the distance measuring camera 1 of the third embodiment will be described by placing emphasis on the points differing from the distance measuring camera 1 of the first embodiment with the same matters being omitted from the description. The distance measuring camera 1 of the present embodiment has the same configuration as the configuration of the distance measuring camera 1 of the first embodiment except that the configurations of the first optical system OS1 and the second optical system OS2 are modified.

The distance measuring camera 1 of the present embodiment is characterized in that the first optical system OS1 and the second optical system OS2 are configured so as to satisfy the second condition that the distance "$EP_1$" from the intersection point between the optical axis of the first optical system OS1 and the extended line of the principal ray at the image height of the distance measurement target point of the first subject image in the image space of the first optical system OS1 to the image formation position of the first subject image when the subject 100 is located at the infinite distance point and the distance "$EP_2$" from the intersection point between the optical axis of the second optical system OS2 and the extended line of the principal ray at the image height of the distance measurement target point of the second subject image in the image space of the second optical system OS2 to the image formation position of the second subject image when the subject 100 is located at the infinite distance point are different from each other ("$EP_1$"≠"$EP_2$") among the above-described three conditions required to calculate the distance "a" to the distance measurement target point of the subject 100 based on the image magnification ratio "MR". On the other hand, in the present embodiment, the first optical system OS1 and the second optical system OS2 are configured and arranged so as not to satisfy the two other conditions ("$f_1$," "$f_2$," and "D"≠0) among the above three conditions. Further, the distance measuring camera 1 of the present embodiment is configured to satisfy the fourth condition that the image magnification ratio "MR" is established as the function of the distance "a".

Therefore, the general equation (13) for calculating the distance "a" to the distance measurement target point of the subject 100 based on the image magnification ratio "MR" is simplified by the conditions of "$f_1$"="$f_2$"="f" and "D"=0, and can be expressed by the following equation (17).

[Equation 17]

$$a = \frac{K \cdot (f^2 - EP_1 \cdot f) - MR \cdot (f^2 - EP_2 \cdot f)}{MR \cdot EP_2 - K \cdot EP_1} \quad (17)$$

Here, the coefficient "K" is expressed by the following equation (18).

[Equation 18]

$$K = \frac{a_{FD1} - f}{a_{FD2} - f} \cdot \frac{f^2 - EP_2 \cdot f + EP_2 \cdot a_{FD2}}{f^2 - EP_1 \cdot f + EP_1 \cdot a_{FD1}} \quad (18)$$

As described above, in the distance measuring camera 1 of the present embodiment, the first optical system OS1 and the second optical system OS2 are configured so that the distance "$EP_1$" from the intersection point between the optical axis of the first optical system OS1 and the extended line of the principal ray at the image height of the distance measurement target point of the first subject image in the image space of the first optical system OS1 to the image formation position of the first subject image when the subject 100 is located at the infinite distance point and the distance "$EP_2$" from the intersection point between the optical axis of the second optical system OS2 and the extended line of the principal ray at the image height of the distance measurement target point of the second subject image in the image space of the second optical system OS2 to the image formation position of the second subject image when the subject 100 is located at the infinite distance point are different from each other ("$EP_1$"≠"$EP_2$"), and thereby the change of the magnification "$m_1$" of the first subject image with respect to the distance "a" to the distance measurement target point of the subject 100 and the change of the magnification "$m_2$" of the second subject image with respect to the distance "a" to the distance measurement target point of the subject 100 are different from each other. Therefore, the distance measuring camera 1 of the present embodiment can uniquely calculate the distance "a" to the distance measurement target point of the subject 100 based on the image magnification ratio "MR" ("$m_2$"/"$m_1$") between the magnification "$m_1$" of the first subject image and the magnification "$m_2$" of the second subject image.

According to the present embodiment, it is also possible to provide the same effects as those of the above-described first embodiment. In this regard, the configurations and the arrangements of the first optical system OS1 and the second optical system OS2 in the present embodiment may be any aspect as long as the above-mentioned second condition ("$EP_1$"≠"$EP_2$") is satisfied, and thereby the change of the magnification "$m_1$" of the first subject image with respect to the distance "a" to the distance measurement target point of the subject 100 and the change of the magnification "$m_2$" of the second subject image with respect to the distance "a" to the distance measurement target point of the subject 100 are different from each other.

Fourth Embodiment

Figure 9:
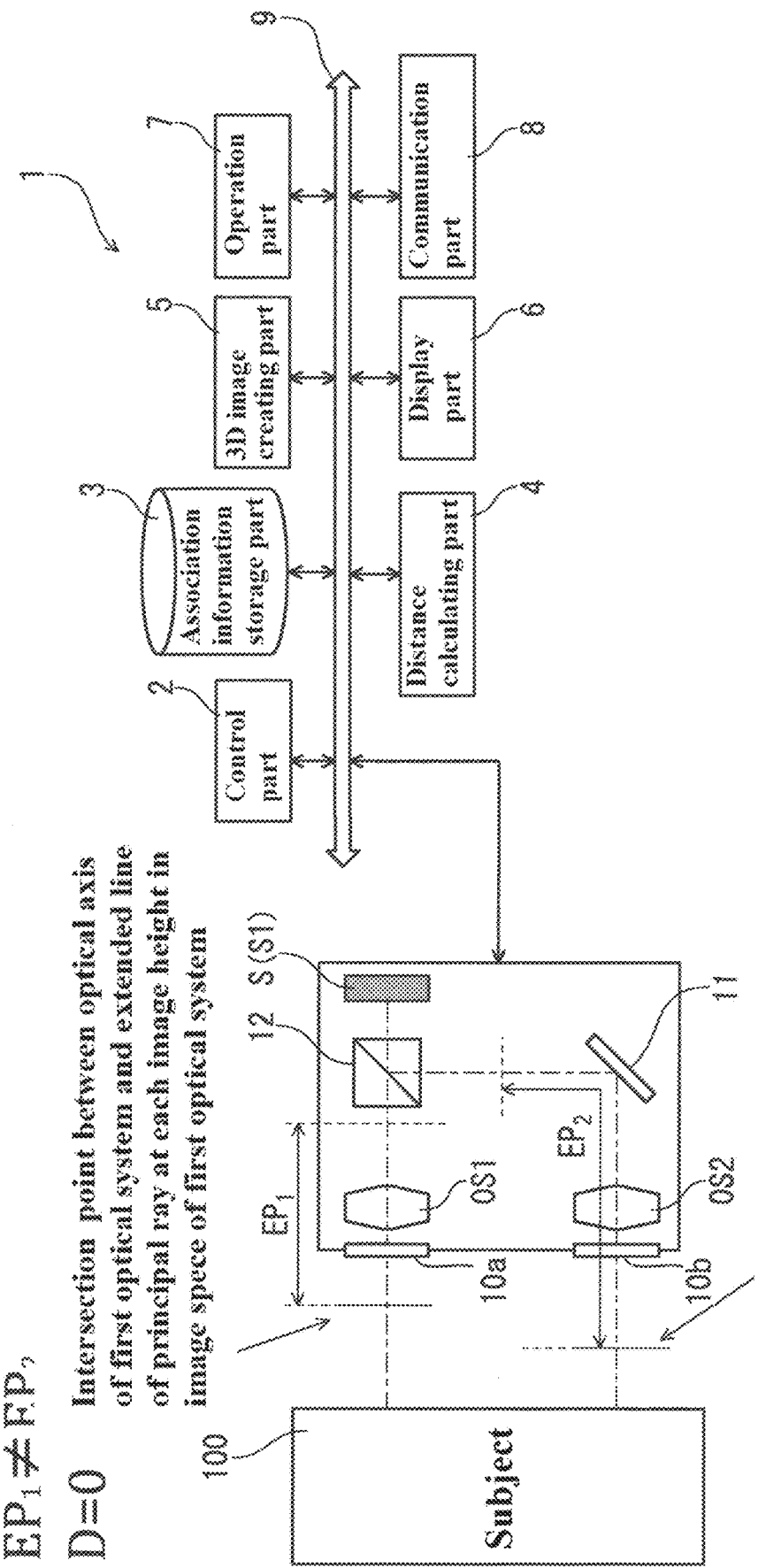
FIG. 9 is a block diagram schematically showing a distance measuring camera according to a fourth embodiment of the present disclosure.

Next, a distance measuring camera 1 according to a fourth embodiment of the present disclosure will be described in detail with reference to FIG. 9. FIG. 9 is a block diagram schematically showing the distance measuring camera according to the fourth embodiment of the present disclosure.

Hereinafter, the distance measuring camera 1 of the fourth embodiment will be described by placing emphasis on the points differing from the distance measuring camera 1 of the third embodiment with the same matters being omitted from the description. Differences between the distance measuring camera 1 of the present embodiment and the distance measuring camera 1 of the third embodiment are the same as the differences between the distance measuring camera 1 of the second embodiment and the distance measuring camera 1 of the first embodiment described above. Namely, the distance measuring camera 1 of the fourth embodiment has the same configuration as the configuration of the distance measuring camera 1 of the third embodiment except that the imaging part S is constituted of only the first image sensor S1, the first optical system OS1 and the second optical system OS2 are provided in one housing, the first shutter 10a, the second shutter 10b, the mirror 11 and the prism 12 are provided in the one housing.

Similar to the distance measuring camera 1 of the second embodiment, in the distance measuring camera 1 of the present embodiment, the first optical system OS1 and the second optical system OS2 are arranged in the one housing. Further, the first shutter 10a for blocking the incidence of the light from the subject 100 to the first optical system OS1 is arranged on the front side of the first optical system OS1 (on the subject side) and the second shutter 10b for blocking the incidence of the light from the subject 100 to the second optical system OS2 is arranged on the front side of the second optical system OS2.

Since the first shutter 10a and the second shutter 10b perform the same operation as the second embodiment described above, the distance measuring camera 1 can use only a single image sensor (the first image sensor S1) to separately obtain the image signal of the first subject image and the image signal of the second subject image.

According to the present embodiment, it is also possible to provide the same effects as those of the above-described third embodiment. In addition, similarly to the second embodiment described above, in the present embodiment, the imaging part S can be constituted of the single image sensor (the first image sensor S1) which can image both of the first subject image formed by the first optical system OS1 and the second subject image formed by the second optical system OS2. Thus, it is possible to reduce the size and the cost of the distance measuring camera 1.

Fifth Embodiment

Figure 10:
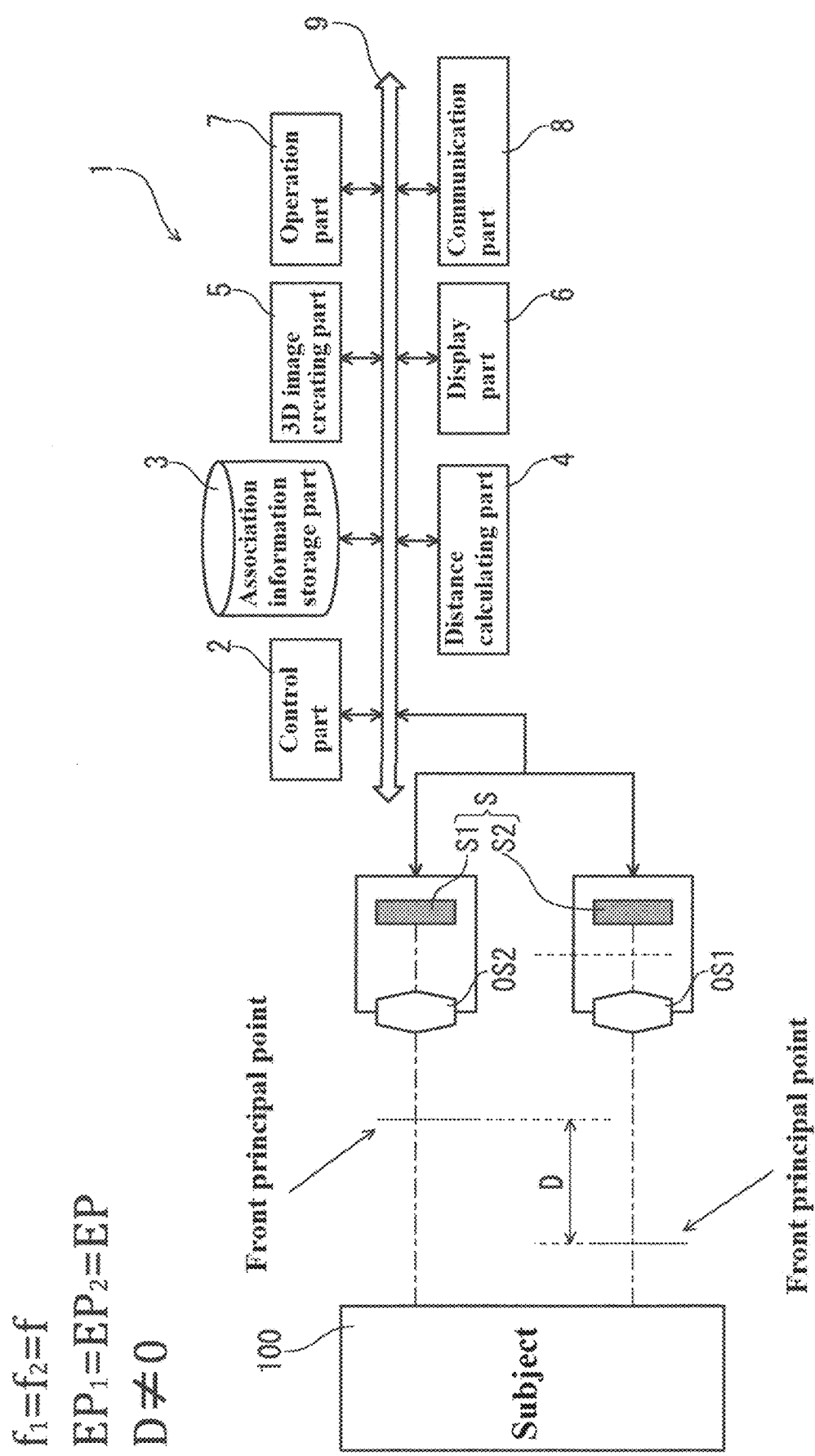
FIG. 10 is a block diagram schematically showing a distance measuring camera according to a fifth embodiment of the present disclosure.

Next, a distance measuring camera 1 according to a fifth embodiment of the present disclosure will be described in detail with reference to FIG. 10. FIG. 10 is a block diagram schematically showing the distance measuring camera according to the fifth embodiment of the present disclosure.

Hereinafter, the distance measuring camera 1 of the fifth embodiment will be described by placing emphasis on the points differing from the distance measuring camera 1 of the first embodiment with the same matters being omitted from the description. The distance measuring camera 1 of the fifth embodiment has the same configuration as the configuration of the distance measuring camera 1 of the first embodiment except that the configurations and the arrangements of the first optical system OS1 and the second optical system OS2 are modified.

The distance measuring camera 1 of the present embodiment is characterized in that the first optical system OS1 and the second optical system OS2 are configured and arranged so as to satisfy the third condition that the difference "D" in the depth direction (the optical axis direction) exists between the front principal point of the first optical system OS1 and the front principal point of the second optical system OS2 among the above-mentioned three conditions required to calculate the distance "a" to the distance measurement target point of the subject 100 based on the image magnification ratio "MR". On the other hand, in the present embodiment, the first optical system OS1 and the second optical system OS2 are configured so as not to satisfy the two other conditions ("$f_1$"≠"$f_2$" and "$EP_1$"≠"$EP_2$") among the above-mentioned three conditions. Further, the distance measuring camera 1 of the present embodiment is configured to satisfy the fourth condition that the image magnification ratio "MR" is established as the function of the distance "a".

Therefore, the general equation (13) for calculating the distance "a" to the distance measurement target point of the subject 100 based on the image magnification "MR" is simplified by the conditions of "$f_1$"="$f_2$"="f" and "$EP_1$"="$EP_2$"="EP", and can be expressed by the following equation (19).

[Equation 19]

$$a = \frac{K \cdot (f^2 - EP \cdot f) - MR \cdot (f^2 - EP \cdot f + EP \cdot D)}{EP \cdot (MR - K)} \quad (19)$$

Here, the coefficient "K" is expressed by the following equation (20).

[Equation 20]

$$K = \frac{a_{FD1} - f}{a_{FD2} - f} \cdot \frac{f^2 - EP \cdot f + EP \cdot a_{FD2}}{f^2 - EP \cdot f + EP \cdot a_{FD1}} \quad (20)$$

As described above, in the distance measuring camera 1 of the present embodiment, the first optical system OS1 and the second optical system OS2 are configured and arranged so that the difference "D" in the depth direction (the optical axis direction) exists between the front principal point of the first optical system OS1 and the front principal point of the second optical system OS2 ("D"≠0), and thereby the change of the magnification "$m_1$" of the first subject image with respect to the distance "a" to the distance measurement target point of the subject 100 and the change of the magnification "$m_2$" of the second subject image with respect to the distance "a" to the distance measurement target point of the subject 100 are different from each other. Therefore, the distance measuring camera 1 of the present embodiment can uniquely calculate the distance "a" to the distance measurement target point of the subject 100 based on the image magnification ratio "MR" ("$m_2$"/"$m_1$") between the magnification "$m_1$" of the first subject image and the magnification "$m_2$" of the second subject image.

According to the present embodiment, it is also possible to provide the same effects as those of the above-described first embodiment. In this regard, the configurations and the arrangements of the first optical system OS1 and the second optical system OS2 in the present embodiment may be any aspect as long as the above-mentioned third condition ("D"≠0) is satisfied, and thereby the change of the magnification "$m_1$" of the first subject image with respect to the distance "a" to the distance measurement target point of the subject 100 and the change of the magnification "$m_2$" of the second subject image with respect to the distance "a" to the distance measurement target point of the subject 100 are different from each other.

Sixth Embodiment

Figure 11:
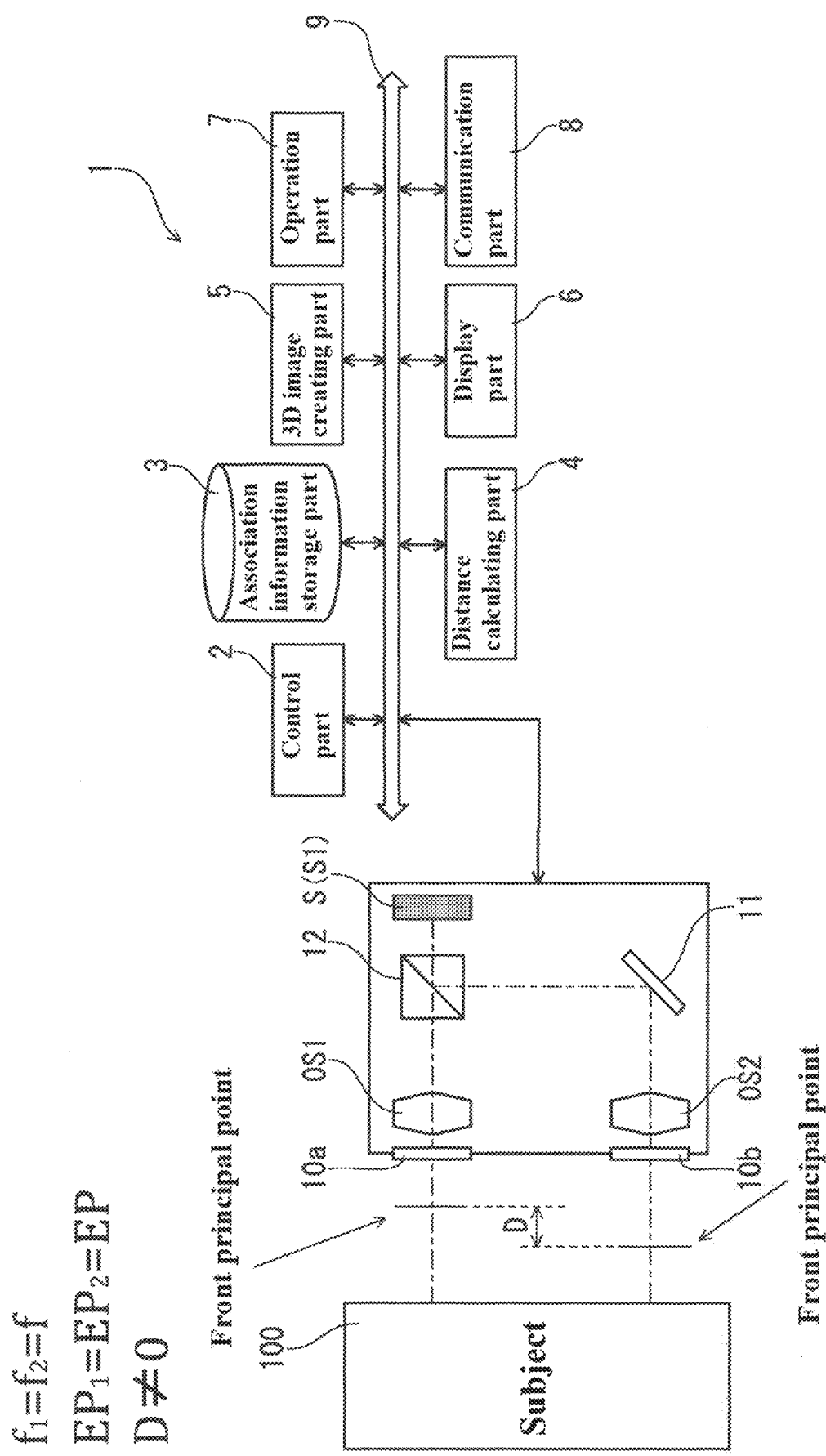
FIG. 11 is a block diagram schematically showing a distance measuring camera according to a sixth embodiment of the present disclosure.

Next, a distance measuring camera 1 according to a sixth embodiment of the present disclosure will be described in detail with reference to FIG. 11. FIG. 11 is a block diagram schematically showing the distance measuring camera according to the sixth embodiment of the present disclosure.

Hereinafter, the distance measuring camera 1 of the sixth embodiment will be described by placing emphasis on the points differing from the distance measuring camera 1 of the fifth embodiment with the same matters being omitted from the description. Differences between the distance measuring camera 1 of the present embodiment and the distance measuring camera 1 of the fifth embodiment are the same as the differences between the distance measuring camera 1 of the second embodiment and the distance measuring camera 1 of the first embodiment and the differences between the distance measuring camera 1 of the fourth embodiment and the distance measuring camera 1 of the third embodiment. Namely, the distance measuring camera 1 of the sixth embodiment has the same configuration as the configuration of the distance measuring camera 1 of the fifth embodiment except that the imaging part S is constituted of only the first image sensor S1, the first optical system OS1 and the second optical system OS2 are provided in one housing, the first shutter 10a, the second shutter 10b, the mirror 11 and the prism 12 are provided in the one housing.

In the present embodiment, the first optical system OS1 and the second optical system OS2 are arranged on the same straight line in a direction perpendicular to the depth direction (the optical axis direction) in the one housing as shown in the drawing. On the other hand, the first optical system OS1 and the second optical system OS2 are configured so that a distance from the first optical system OS1 to the front principal point of the first optical system OS1 and a distance from the second optical system OS2 to the front principal point of the second optical system OS2 are different from each other and thus the difference "D" in the depth direction (the optical axis direction) exists between the front principal point of the first optical system OS1 and the front principal point of the second optical system OS2 ("D"≠0).

Similar to the distance measuring cameras 1 of the second embodiment and the fourth embodiment, in the distance measuring camera 1 of the present embodiment, the first optical system OS1 and the second optical system OS2 are arranged in the one housing. Further, the first shutter 10a for blocking the incidence of the light from the subject 100 to the first optical system OS1 is arranged on the front side of the first optical system OS1 (on the subject side) and the second shutter 10b for blocking the incidence of the light from the subject 100 to the second optical system OS2 is arranged on the front side of the second optical system OS2.

Since the first shutter 10a and the second shutter 10b perform the same operation as the second embodiment and the fourth embodiment described above, the distance measuring camera 1 can use only a single image sensor (the first image sensor S1) to separately obtain the image signal of the first subject image and the image signal of the second subject image.

According to the present embodiment, it is also possible to provide the same effects as those of the above-described fifth embodiment. In addition, similarly to the second embodiment described above, in the present embodiment, the imaging part S can be configured by the single image sensor (the first image sensor S1) which can image both of the first subject image formed by the first optical system OS1 and the second subject image formed by the second optical system OS2. Thus, it is possible to reduce the size and the cost of the distance measuring camera 1.

Seventh Embodiment

Figure 12:
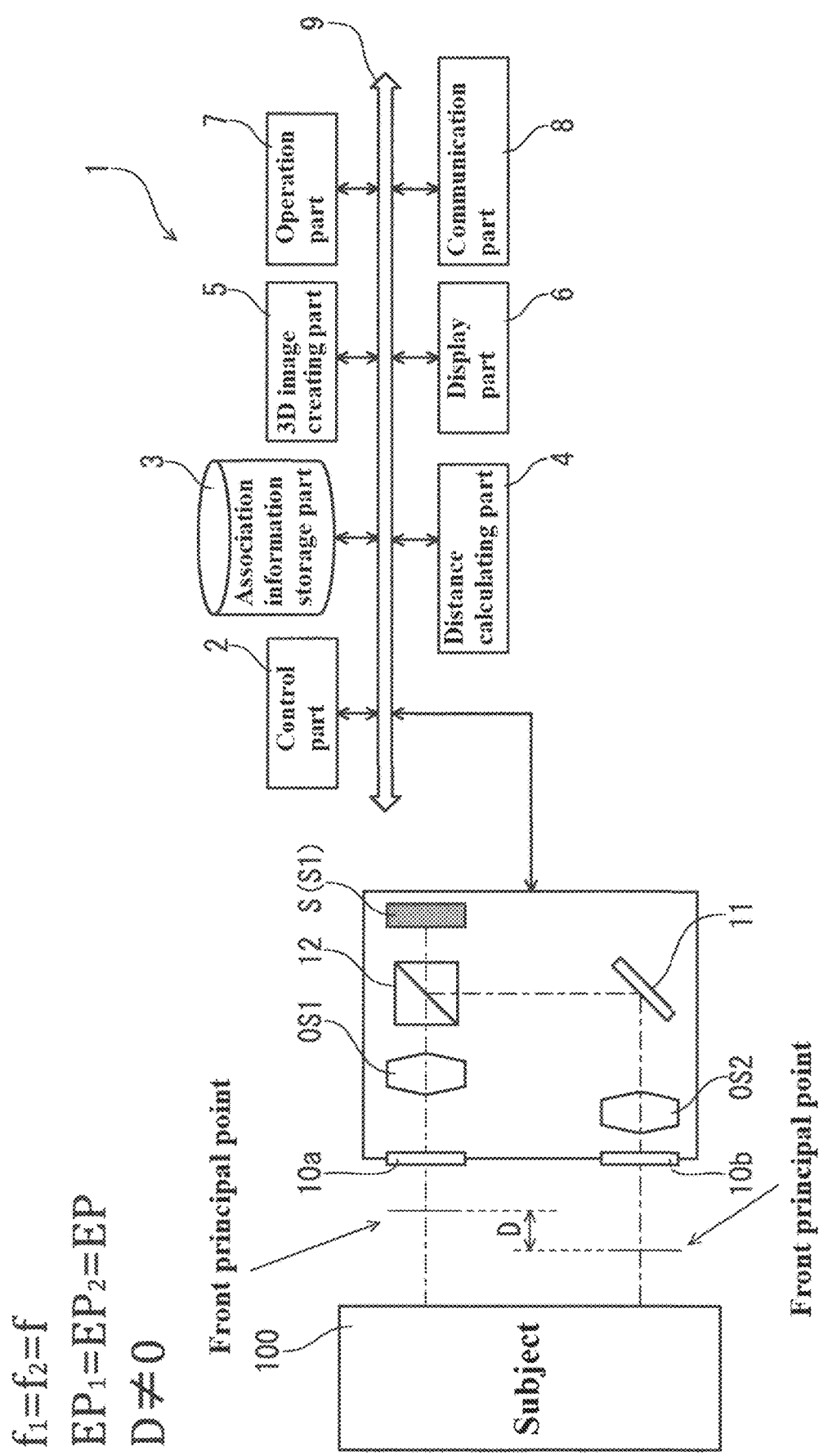
FIG. 12 is a block diagram schematically showing a distance measuring camera according to a seventh embodiment of the present disclosure.

Next, a distance measuring camera 1 according to a seventh embodiment of the present disclosure will be described in detail with reference to FIG. 12. FIG. 12 is a block diagram schematically showing the distance measuring camera according to the seventh embodiment of the present disclosure.

Hereinafter, the distance measuring camera 1 of the seventh embodiment will be described by placing emphasis on the points differing from the distance measuring camera 1 of the sixth embodiment with the same matters being omitted from the description. The distance measuring camera 1 of the seventh embodiment has the same configuration as the configuration of the distance measuring camera 1 of the sixth embodiment except that the configuration and arrangements of the first optical system OS1 and the second optical system OS2 are modified.

As shown in FIG. 12, in the present embodiment, the first optical system OS1 and the second optical system OS2 are arranged in the one housing so that a difference in the depth direction exists between the positions of the first optical system OS1 and the second optical system OS2. Therefore, even if the first optical system OS1 and the second optical system OS2 are configured so that the distance from the first optical system OS1 to the front principal point of the first optical system OS1 and the distance from the second optical system OS2 to the front principal point of the second optical system OS2 are equal to each other, it is possible to ensure the distance "D" in the depth direction (the optical axis direction) between the front principal point of the first optical system OS1 and the front principal point of the second optical system OS2 ("D"≠0). According to the present embodiment, it is also possible to provide the same effects as those of the above-described sixth embodiment.

As described above with reference to each embodiment, the distance measuring camera 1 of the present disclosure can uniquely calculate the distance "a" to the distance measurement target point of the subject 100 based on the image magnification ratio "MR" ("$m_2$"/"$m_1$") between the magnification "$m_1$" of the first subject image and the magnification "$m_2$" of the second subject image without using any disparity between a plurality of images and without irradiating any constant pattern onto the subject 100.

Therefore, since the distance measuring camera 1 of the present disclosure does not need to ensure a large disparity unlike the conventional stereo camera type distance measuring camera using a disparity between a plurality of images, it is possible to accurately calculate the distance "a" to the distance measurement target point of the subject 100 even if the first optical system OS1 and the second optical system OS2 are arranged so as to be close to each other. Thus, it is possible to reduce the size of the distance measuring camera 1 as compared with the conventional stereo camera type distance measuring camera. Further, since the distance measuring camera 1 of the present disclosure does not use any disparity to calculate the distance "a" to the distance measurement target point of the subject 100, it is possible to accurately calculate the distance "a" to the distance measurement target point of the subject 100 even if the subject 100 is located at a position closed to the distance measuring camera 1. Further, according to the present disclosure, it becomes unnecessary to design the distance measuring camera 1 with considering the disparity. Thus, it is possible to enhance the flexibility of design for the distance measuring camera.

Further, in the distance measuring camera 1 of the present disclosure, the distance calculating part 4 identifies the value of the distance "$EP_1$" from the intersection point between the optical axis of the first optical system OS1 and the extended line of the principal ray at the image height of the distance measurement target point of the first subject image in the image space of the first optical system OS1 to the image formation position of the first subject image when the subject 100 is located at the infinite distance point based on the image height of the distance measurement target point of the first subject image in the image space of the first optical system OS1. Similarly, the distance calculating part 4 identifies the value of the distance "$EP_2$" from the intersection point between the optical axis of the second optical system OS2 and the extended line of the principal ray at the image height of the distance measurement target point of the second subject image in the image space of the second optical system OS2 to the image formation position of the second subject image when the subject 100 is located at the infinite distance point based on the image height of the distance measurement target point of the second subject image in the image space of the second optical system OS2. Therefore, even if each of the first optical system OS1 and the second optical system OS2 is the optical system in which the vignetting occurs depending on the image height of the distance measurement target point of the subject image and the image heights of the distance measurement target points of the first subject image and the second subject image corresponding to the distance measurement target point of the subject 100 are high, the distance calculating part 4 can accurately calculate the distance "a" to the distance measurement target point of the subject 100.

Further, the distance measuring camera 1 of the present disclosure does not need to use a special light source such as a projector for projecting constant pattern light onto the subject 100 unlike the conventional pattern projection type distance measuring camera. Thus, it is possible to simplify the system configuration of the distance measuring camera 1. As a result, it is possible to realize downsizing, power-saving and cost-reducing of the distance measuring camera 1 as compared with the conventional pattern projection type distance measuring camera.

Further, as described above, in the distance measuring camera 1 of the present disclosure, the above-mentioned general expression (13) used for calculating the distance "a" to the distance measurement target point of the subject 100 based on the image magnification ratio "MR" can be used for calculating the distance "a" to the subject 100 even if each of the first optical system OS1 and the second optical system OS2 is a fixed focus system which does not have an autofocus function and even when defocus exists, that is the case that the imaging surface of the first image sensor S1 is not located at the image formation position of the first subject image and the imaging surface of the second image sensor S2 is not located at the image formation position of the second subject image.

Therefore, the distance measuring camera 1 of the present disclosure does not need to use a lens actuator system for providing the autofocus function for the first optical system OS1 and the second optical system OS2. Therefore, it is possible to reduce the number of parts of the distance measuring camera 1 and thus it is possible to reduce the size, the weight and the cost of the distance measuring camera 1. Further, since it is not necessary to actuate the first optical system OS1 and the second optical system OS2 by consuming power, it is possible to reduce the consumed power of the distance measuring camera 1. Further, since the processing time required for the focus operation is also unnecessary, it is also possible to shorten the measurement time required to calculate the distance "a" to the distance measurement target point of the subject 100.

Further, although the two optical systems (the first optical system OS1 and the second optical system OS2) are used in the above embodiments, the number of the optical systems used in the present disclosure is not limited thereto. For example, an aspect further comprising an additional optical system in addition to the first optical system OS1 and the second optical system OS2 is also involved within the scope of the present disclosure. In this case, the additional optical system is configured and arranged so that a change of a magnification of a subject image formed by the additional optical system with respect to the distance "a" to the distance measurement target point of the subject 100 is different from the change of the magnification "$m_1$" of the first subject image with respect to the distance "a" to the distance measurement target point the subject 100 and the change of the magnification "$m_2$" of the second subject image with respect to the distance "a" to the distance measurement target point the subject 100.

In this regard, although the first optical system OS1 and the second optical system OS2 are configured and arranged so as to satisfy one of the above-mentioned three conditions required to calculate the distance "a" to the distance measurement target point of the subject 100 based on the image magnification ratio "MR" in each embodiment described above, the present disclosure is not limited thereto as long as the first optical system OS1 and the second optical system OS2 are configured and arranged so as to satisfy at least one of the above-mentioned three conditions. For example, an aspect in which the first optical system OS1 and the second optical system OS2 are configured and arranged so as to satisfy all or any combinations of the above-mentioned three conditions is also involved within the scope of the present disclosure.

Distance Measuring Method

Figure 13:
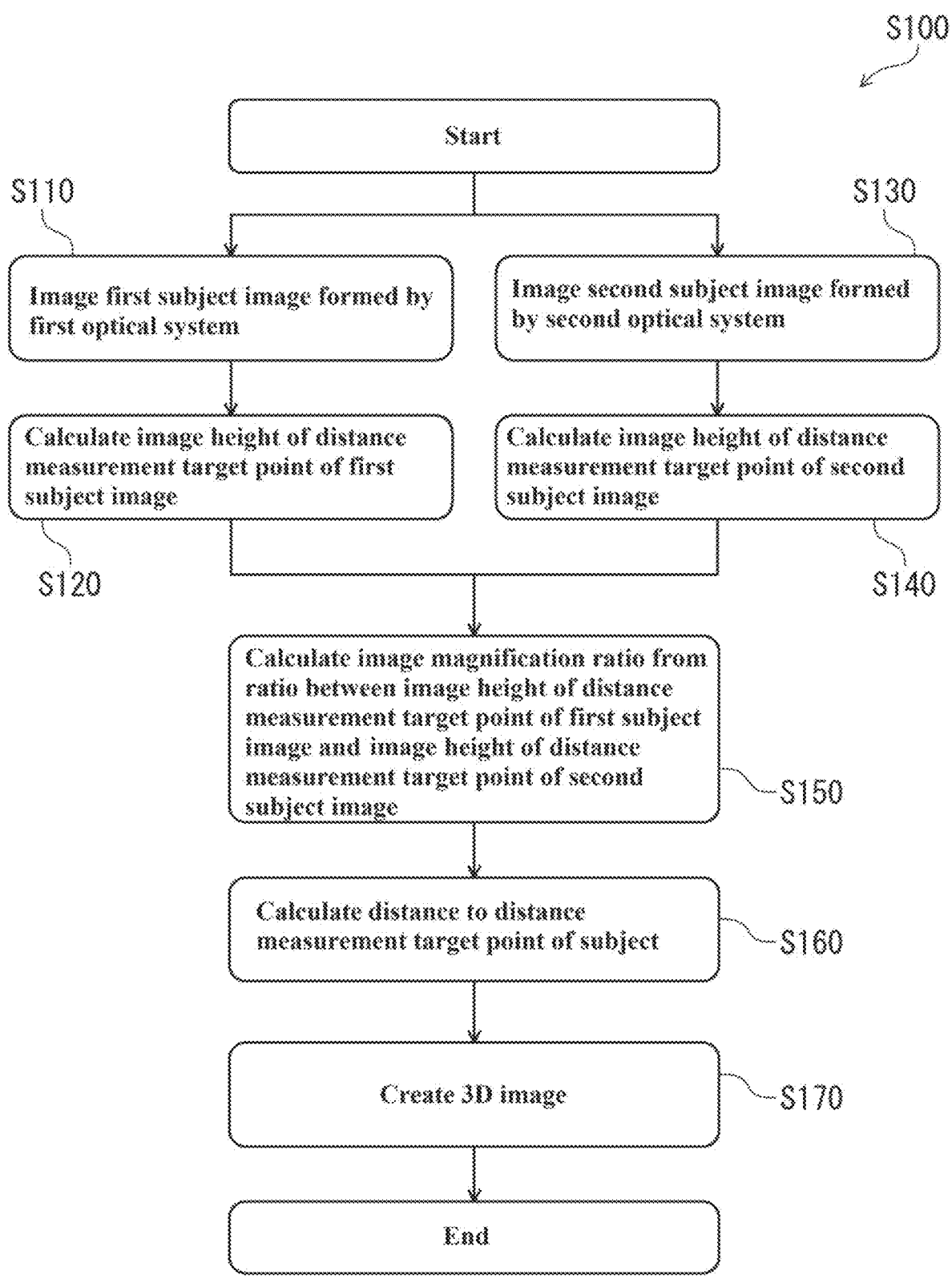
FIG. 13 is a flowchart for explaining a distance measuring method performed by the distance measuring camera of the present disclosure.

Next, a distance measuring method performed by the distance measuring camera 1 of the present disclosure will be described with reference to FIG. 13. FIG. 13 is a flowchart for explaining the distance measuring method performed by the distance measuring camera of the present disclosure. Although the distance measuring method described in detail below can be performed by using the distance measuring cameras 1 according to the first to seventh embodiments of the present disclosure and an arbitrary apparatus having the same function as that of the distance measuring camera 1 described above, for the sake of explanation, it is assumed that the distance measuring method is performed by using the distance measuring camera 1 according to the first embodiment.

A distance measuring method S100 shown in FIG. 13 is started when the user of the distance measuring camera 1 uses the operation part 7 to perform an operation for measuring the distance "a" to the distance measurement target point of the subject 100. At a step S110, the first image sensor S1 of the imaging part S images the first subject image formed by the first optical system OS1 to obtain the image signal of the first subject image. The image signal of the first subject image is transmitted to the control part 2 and the distance calculating part 4 through the data bus 9. At a step S120, the distance calculating part 4 calculates the image height (the distance from the optical axis of the first optical system OS1 in the direction perpendicular to the optical axis of the first optical system OS1) "$Y_{FD1}$" of the distance measurement target point of the first subject image from the received image signal of the first subject image.

On the other hand, at a step S130, the second image sensor S2 of the imaging part S images the second subject image formed by the second optical system OS2 to obtain the image signal of the second subject image. The image signal of the second subject image is transmitted to the control part 2 and the distance calculating part 4 through the data bus 9. At a step S140, the distance calculating part 4 calculates the image height (the distance from the optical axis of the second optical system OS2 in the direction perpendicular to the optical axis of the second optical system OS2) "$Y_{FD2}$" of the distance measurement target point of the second subject image from the received image signal of the second subject image.

In this regard, to obtain the image signal of the first subject image at the step S110 and to calculate the image height "$Y_{FD1}$" of the distance measurement target point of the first subject image at the step S120 may be performed simultaneously with to obtain the image signal of the second subject image at the step S130 and to calculate the image height "$Y_{FD2}$" of the distance measurement target point of the second subject image at the step S140, or may be performed separately from them.

When both of the image height "$Y_{FD1}$" of the distance measurement target point of the first subject image and the image height "$Y_{FD2}$" of the distance measurement target point of the second subject image are calculated, the process proceeds to a step S150. At the step S150, the distance calculating part 4 calculates the image magnification ratio "MR" between the magnification "$m_1$" of the first subject image and the magnification "$m_2$" of the second subject image based on the image height "$Y_{FD1}$" of the distance measurement target point of the first subject image and the image height "$Y_{FD2}$" of the distance measurement target point of the second subject image according to the above equation (14) "MR"="$Y_{FD2}$"/"$Y_{FD1}$".

Next, at a step S160, the distance calculating part 4 refers to the look-up table or the mathematical expression for uniquely identifying the value of the distance "$EP_1$" from the image height "$Y_{FD1}$" of the distance measurement target point of the first subject image which is stored in the association information storage part 3 as one of the association information to identify the value of the distance "$EP_1$" from the calculated image height "$Y_{FD1}$" of the distance measurement target point of the first subject image. Similarly, the distance calculating part 4 refers to the look-up table or the mathematical expression for uniquely identifying the value of the distance "$EP_2$" from the image height "$Y_{FD2}$" of the distance measurement target point of the second subject image which is stored in the association information storage part 3 as one of the association information to identify the value of the distance "$EP_2$" from the calculated image height "$Y_{FD2}$" of the distance measurement target point of the calculated second subject image. After that, the distance calculating part 4 refers to the association information stored in the association information storage part 3, the value of the distance "$EP_1$" identified from the image height "$Y_{FD1}$" of the distance measurement target point of the first subject image and the value of the distance "$EP_2$" identified from the image height "$Y_{FD2}$" of the distance measurement target point of the second subject image to calculate (identify) the distance "a" to the distance measurement target point of the subject 100 based on the calculated image magnification "MR". When the distance "a" to the distance measurement target point of the subject 100 is calculated at the step S160, the process proceeds to a step S170.

At the step S170, the three-dimensional image creating part 5 creates the three-dimensional image of the subject 100 based on the distance "a" to the distance measurement target point of the subject 100 calculated by the distance calculating part 4 and the two-dimensional image of the subject 100 (the image signal of the first subject image or the image signal of the second subject image) obtained by the imaging part S. After that, the two-dimensional image of the subject 100, the distance "a" to the distance measurement target point of the subject 100 and/or the three-dimensional image of the subject 100 obtained in the previous steps are displayed on the display part 6 or transmitted to an external device by the communication part 8. Next, the distance measuring method S100 ends.

Although the distance measuring camera of the present disclosure has been described based on the embodiments shown in the drawings, the present disclosure is not limited thereto. Each configuration of the present disclosure can be replaced with any configuration capable of performing the same function or any configuration can be added to each configuration of the present disclosure.

A person having skill in the art and the field to which the present disclosure belongs would be able to carry out modifications of the described configuration of the distance measuring camera of the present disclosure without meaningfully departing from the principles, ideas and scope of the present disclosure. Further, distance measuring cameras having modified configurations are also involved within the scope of the present disclosure. For example, an aspect in which the distance measuring cameras of the first to seventh embodiments are arbitrarily combined is also involved within the scope of the present disclosure.

In addition, the number and types of components of the distance measuring camera shown in FIGS. 6 to 12 are merely illustrative examples, and the present disclosure is not necessarily limited thereto. An aspect in which any component is added or combined or any component is omitted without departing from the principle and intent of the present disclosure is also involved within the scope of the present disclosure. Further, each component of the distance measuring camera may be practiced by hardware, software or a combination thereof.

In addition, the number and types of the steps of the distance measuring method S100 shown in FIG. 13 are merely illustrative examples and the present disclosure is not necessarily limited to thereto. Further, an aspect that any steps have been added or combined for any purpose or any steps have been omitted without departing from the principle and intent of the present disclosure is also involved within the scope of the present disclosure.

Examples of Application

An example of application of the distance measuring camera 1 of the present disclosure is not particularly limited. For example, the distance measuring camera 1 can be used for imaging a portrait of the subject and obtaining a three-dimensional image of a face of the subject. In such an application, it can incorporate the distance measuring camera 1 of the present disclosure into a mobile device such as a smart phone or a mobile phone.

Further, the distance measuring camera 1 of the present disclosure can be applied for a handler robot used for assembling and inspecting a precision device. According to the distance measuring camera 1, since it is possible to measure a distance from an arm or a main body of the handler robot to the precision device or parts thereof when assembling the precision device, it becomes possible to allow a gripping portion of the handler robot to accurately grip the parts.

Further, since the distance measuring camera 1 of the present disclosure can measure the distance to the distance measurement target point of the subject, it is possible to obtain three-dimensional information of the subject. Such three-dimensional information of the subject can be used for forming a three-dimensional structure due to a 3D printer.

Further, by utilizing the distance measuring camera 1 of the present disclosure for a vehicle, it is possible to measure a distance from the vehicle to any object such as a pedestrian or an obstacle. Information on the calculated distance to any object can be used for automatic braking systems and automatic driving of the vehicle.

INDUSTRIAL APPLICABILITY

The distance measuring camera of the present disclosure uses the at least two optical systems (the first optical system and the second optical) whose changes of the magnifications of the subject images according to the distance to the distance measurement target point of the subject are different from each other and performs the calculation depending on the image heights of the distance measurement target points of the first subject image and the second subject image corresponding to the distance measurement target point of the subject image to calculate the distance to the distance measurement target point of the subject based on the image magnification ratio (ratio of magnifications) between the first subject image and the second subject image respectively formed by the first optical system and the second optical. Therefore, even if each of the first optical system and the second optical system used to calculate the distance to the distance measurement target point of the subject is the optical system in which the vignetting occurs and the image heights of the distance measurement target points of the first subject image and the second subject image corresponding to the distance measurement target point of the subject and respectively formed by the first optical system and the second optical system are high, it is possible to accurately measure the distance to the distance measurement target point of the subject. Thus, the present disclosure has industrial applicability.

The invention claimed is:

1. A distance measuring camera for calculating a distance to a distance measurement target point of a subject, comprising:
   a first optical system for collecting light from the subject to form a first subject image;
   a second optical system for collecting the light from the subject to form a second subject image;
   an imaging part for imaging the first subject image formed by the first optical system and the second subject image formed by the second optical system; and
   a distance calculating part for performing calculation depending on image heights of distance measurement target points of the first subject image and the second subject image corresponding to the distance measurement target point of the subject to calculate the distance to the distance measurement target point of the subject based on the first subject image and the second subject image imaged by the imaging part,
   wherein the distance calculating part calculates the distance to the distance measurement target point of the subject based on an image magnification ratio between a magnification of the first subject image and a magnification of the second subject image, wherein the first optical system is an optical system in which vignetting occurs depending on the image height of the distance measurement target point of the first subject image corresponding to the distance measurement target point of the subject and a position of an intersection point between an optical axis of the first optical system and an extended line of a principal ray at the image height of the distance measurement target point of the first subject image in an image space of the first optical system changes depending on the image height of the distance measurement target point of the first subject image, wherein the second optical system is an optical system in which vignetting occurs depending on the image height of the distance measurement target point of the second subject image corresponding to the distance measurement target point of the subject and a position of an intersection point between an optical axis of the second optical system and an extended line of a principal ray at the image height of the distance measurement target point of the second subject image in an image space of the second optical system changes depending on the image height of the distance measurement target point of the second subject image, and wherein the distance calculating part is configured to perform the calculation using a distance from the intersection point between the optical axis of the first optical system and the extended line of the principal ray at the image height of the distance measurement target point of the first subject image in the image space of the first optical system to an image formation position of the first subject image when the subject is located at an infinite distance point and a distance from the intersection point between the optical axis of the second optical system and the extended line of the principal ray at the image height of the distance measurement target point of the second subject image in the image space of the second optical system to an image formation position of the second subject image when the subject is located at the infinite distance point to calculate the distance to the distance measurement target point of the subject based on the image magnification ratio between the magnification of the first subject image and the magnification of the second subject image.

2. The distance measuring camera as claimed in claim 1, wherein the first optical system and the second optical system are configured so that a focal length of the first optical system and a focal length of the second optical system are different from each other, and thereby a change of the magnification of the first subject image according to the distance to the distance measurement target point of the subject is different from a change of the magnification of the second subject image according to the distance to the distance measurement target point of the subject.

3. The distance measuring camera as claimed in claim 1, wherein the first optical system and the second optical system are configured so that the distance from the intersection point between the optical axis of the first optical system and the extended line of the principal ray at the image height of the distance measurement target point of the first subject image in the image space of the first optical system to the image formation position of the first subject image when the subject is located at the infinite distance point is different from the distance from the intersection point between the optical axis of the second optical system and the extended line of the principal ray at the image height of the distance measurement target point of the second subject image in the image space of the second optical system to the image formation position of the second subject image when the subject is located at the infinite distance point, and thereby a change of the magnification of the first subject image according to the distance to the distance measurement target point of the subject is different from a change of the magnification of the second subject image according to the distance to the distance measurement target point of the subject.

4. The distance measuring camera as claimed in claim 1, wherein a difference in a depth direction exists between a front principal point of the first optical system and a front principal point of the second optical system, and thereby a change of the magnification of the first subject image according to the distance to the distance measurement target point of the subject is different from a change of the magnification of the second subject image according to the distance to the distance measurement target point of the subject.

5. The distance measuring camera as claimed in claim 1, further comprising an association information storage part storing association information for associating the image magnification ratio between the magnification of the first subject image and the magnification of the second subject image with the distance to the distance measurement target point of the subject, wherein the distance calculating part calculates the distance to the distance measurement target point of the subject based on the image magnification ratio between the magnification of the first subject image and the magnification of the second subject image and the association information in the association information storage part.

6. The distance measuring camera as claimed in claim 1, wherein the distance calculating part calculates a ratio between the image height of the distance measurement target point of the first subject image corresponding to the distance measurement target point of the subject and the image height of the distance measurement target point of the second subject image corresponding to the distance measurement target point of the subject as the image magnification ratio between the magnification of the first subject image and the magnification of the second subject image.

7. The distance measuring camera as claimed in claim 1, wherein the imaging part contains a first image sensor for imaging the first subject image and a second image sensor for imaging the second subject image.

8. The distance measuring camera as claimed in claim 1, wherein the imaging part is a single image sensor for imaging both of the first subject image and the second subject image.

* * * * *